United States Patent
Gainsboro et al.

(10) Patent No.: US 10,237,399 B1
(45) Date of Patent: *Mar. 19, 2019

(54) IDENTICAL CONVERSATION DETECTION METHOD AND APPARATUS

(71) Applicant: Voice Analytics Technologies, LLC, Dallas, TX (US)

(72) Inventors: Jay Gainsboro, Framingham, MA (US); Ken Sinclair, Waban, MA (US); Lee Weinstein, Arlington, MA (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,715

(22) Filed: Mar. 31, 2015

Related U.S. Application Data

(63) Continuation-in-part of application No. 14/242,026, filed on Apr. 1, 2014, now Pat. No. 9,621,713.

(51) Int. Cl.
*H04M 1/64* (2006.01)
*H04M 3/22* (2006.01)
*H04M 3/42* (2006.01)

(52) U.S. Cl.
CPC ..... *H04M 3/2281* (2013.01); *H04M 3/42221* (2013.01)

(58) Field of Classification Search
CPC .............. G10L 15/26; H04M 2201/41; H04M 2203/6027; H04M 3/2281; H04M 3/436
USPC ............................ 379/88.01–88.19
See application file for complete search history.

(56) References Cited

U.S. PATENT DOCUMENTS

| | | |
|---|---|---|
| 4,586,195 A | 4/1986 | DeGeorge et al. |
| 4,843,377 A | 6/1989 | Fuller et al. |
| 5,319,702 A | 6/1994 | Kitchin et al. |
| 5,623,539 A | 4/1997 | Bassenyemukasa et al. |
| 5,638,486 A | 6/1997 | Wang et al. |
| 5,655,013 A | 8/1997 | Gainsboro |
| 5,732,184 A | 3/1998 | Chao et al. |
| 5,796,811 A | 8/1998 | McFarlen |
| 5,805,674 A | 9/1998 | Anderson, Jr. |
| 5,805,685 A | 9/1998 | McFarlen |
| 5,839,103 A | 11/1998 | Mammone et al. |
| 5,883,945 A | 3/1999 | Richardson, Jr. et al. |
| 5,926,533 A | 7/1999 | Gainsboro |
| 6,054,928 A | 4/2000 | Lemelson et al. |
| 6,064,963 A | 5/2000 | Gainsboro |
| 6,081,780 A | 6/2000 | Lumelsky |
| 6,101,468 A | 8/2000 | Gould et al. |
| 6,141,406 A | 10/2000 | Johnson |

(Continued)

OTHER PUBLICATIONS

MIT Media Lab Technical Report No. 585, Jan. 2005, which appeared in Intelligent user Interfaces (IUI 05), 2005, San Diego, California, USA.

(Continued)

*Primary Examiner* — Solomon G Bezuayehu
(74) *Attorney, Agent, or Firm* — Fogarty LLP

(57) ABSTRACT

An automated system is disclosed for detecting situations in which identical segments of conversation appear within two different recordings. The system automatically detects where within each of two audio recordings an identical conversation segment begins and ends, thus enabling detection of conversations where multiple prison inmates participated in a conference call.

9 Claims, 10 Drawing Sheets

(56) References Cited

U.S. PATENT DOCUMENTS

| | | |
|---|---|---|
| 6,347,146 B1 | 2/2002 | Short et al. |
| 6,505,160 B1 | 1/2003 | Levy et al. |
| 6,519,561 B1 | 2/2003 | Farrell et al. |
| 6,542,583 B1 | 4/2003 | Taylor |
| 6,560,323 B2 | 5/2003 | Gainsboro |
| 6,607,136 B1 | 8/2003 | Atsmon et al. |
| 6,611,583 B1 | 8/2003 | Gainsboro |
| 6,665,376 B1 | 12/2003 | Brown |
| 6,760,701 B2 | 7/2004 | Sharma et al. |
| 6,859,528 B1 | 2/2005 | Welte |
| 6,895,084 B1 | 5/2005 | Saylor et al. |
| 6,920,209 B1 | 7/2005 | Gainsboro |
| 7,024,426 B2 | 4/2006 | Black et al. |
| 7,079,637 B1 | 7/2006 | McNitt et al. |
| 7,106,843 B1 | 9/2006 | Gainsboro et al. |
| 7,136,458 B1 | 11/2006 | Zellner et al. |
| 7,403,766 B2 | 7/2008 | Hodge |
| 7,698,566 B1 | 4/2010 | Stone |
| 7,853,243 B2 | 12/2010 | Hodge |
| 7,860,722 B1 | 12/2010 | Chow |
| 7,889,847 B2 | 2/2011 | Gainsboro |
| 8,028,249 B2 | 9/2011 | Loui et al. |
| 8,189,797 B1 | 5/2012 | Ramirez |
| 8,484,084 B2 | 7/2013 | Altberg et al. |
| 9,621,713 B1 | 4/2017 | Gainsboro et al. |
| 2001/0036821 A1 | 11/2001 | Gainsboro et al. |
| 2001/0056349 A1 | 12/2001 | St. John |
| 2002/0094072 A1 | 7/2002 | Evans et al. |
| 2003/0026413 A1 | 2/2003 | Brandt et al. |
| 2003/0220796 A1 | 11/2003 | Aoyama et al. |
| 2003/0228007 A1 | 12/2003 | Kurosaki |
| 2004/0022382 A1 | 2/2004 | Sweeney et al. |
| 2004/0122668 A1 | 6/2004 | Marino et al. |
| 2004/0125124 A1 | 7/2004 | Kim et al. |
| 2004/0249650 A1 | 12/2004 | Freedman et al. |
| 2005/0010409 A1 | 1/2005 | Hull et al. |
| 2005/0018660 A1 | 1/2005 | Hayashi |
| 2005/0032527 A1 | 2/2005 | Sheha et al. |
| 2005/0043014 A1 | 2/2005 | Hodge |
| 2005/0063522 A1 | 3/2005 | Kim et al. |
| 2005/0144015 A1 | 6/2005 | Agapi et al. |
| 2005/0175159 A1 | 8/2005 | Cooper et al. |
| 2005/0190897 A1 | 9/2005 | Eberle et al. |
| 2005/0271251 A1 | 12/2005 | Russell et al. |
| 2006/0029193 A1 | 2/2006 | Timmins et al. |
| 2006/0149558 A1 | 7/2006 | Kahn et al. |
| 2006/0182238 A1* | 8/2006 | Groeger .................. G10L 21/00 |
| | | 379/88.17 |
| 2006/0270465 A1 | 11/2006 | Lee et al. |
| 2006/0285665 A1 | 12/2006 | Wasserblat et al. |
| 2006/0285667 A1 | 12/2006 | Hodge |
| 2007/0003027 A1 | 1/2007 | Brandt |
| 2007/0055398 A1 | 3/2007 | Steinberg |
| 2007/0071206 A1 | 3/2007 | Gainsboro et al. |
| 2007/0185715 A1 | 8/2007 | Wei et al. |
| 2007/0213983 A1 | 9/2007 | Ramsey |
| 2007/0219800 A1 | 9/2007 | Hymel et al. |
| 2007/0223683 A1 | 9/2007 | Pearson |
| 2007/0280436 A1 | 12/2007 | Rajakumar |
| 2008/0033826 A1 | 2/2008 | Maislos et al. |
| 2008/0046241 A1 | 2/2008 | Osburn et al. |
| 2008/0069327 A1 | 3/2008 | Kingsley et al. |
| 2008/0084975 A1 | 4/2008 | Schwartz |
| 2008/0118042 A1 | 5/2008 | Hogg |
| 2008/0159511 A1 | 7/2008 | Keohane et al. |
| 2008/0178278 A1 | 7/2008 | Grinstein et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |
| 2008/0304643 A1 | 12/2008 | Hodge |
| 2009/0046840 A1 | 2/2009 | Luneau et al. |
| 2009/0046841 A1 | 2/2009 | Hodge |
| 2009/0207987 A1 | 8/2009 | Ryan |
| 2009/0262975 A1 | 10/2009 | Rhoads et al. |
| 2010/0207721 A1* | 8/2010 | Nakajima ............. G06F 21/552 |
| | | 340/5.3 |
| 2010/0226525 A1 | 9/2010 | Levy et al. |
| 2010/0235341 A1 | 9/2010 | Bennett |
| 2010/0246807 A1 | 9/2010 | Kemmochi et al. |
| 2011/0040191 A1 | 2/2011 | Kyle et al. |
| 2011/0055256 A1 | 3/2011 | Phillips et al. |
| 2011/0082874 A1 | 4/2011 | Gainsboro et al. |
| 2011/0286585 A1 | 11/2011 | Hodge |
| 2012/0054202 A1 | 3/2012 | Rajakumar |
| 2012/0198317 A1 | 8/2012 | Eppolito |
| 2012/0245936 A1* | 9/2012 | Treglia ............. G06F 17/30746 |
| | | 704/235 |
| 2012/0263285 A1 | 10/2012 | Rajakumar et al. |
| 2013/0016815 A1* | 1/2013 | Odinak ............... H04M 3/5175 |
| | | 379/88.01 |
| 2013/0148798 A1 | 6/2013 | Ellsworth et al. |
| 2013/0216029 A1* | 8/2013 | Pawlewski .......... H04M 3/2281 |
| | | 379/88.01 |
| 2013/0244784 A1 | 9/2013 | Assa |
| 2013/0301810 A1* | 11/2013 | Dunne .................... H04L 65/80 |
| | | 379/32.01 |
| 2014/0120876 A1* | 5/2014 | Shen .................. A61B 5/04525 |
| | | 455/411 |
| 2014/0254777 A1 | 9/2014 | Olligschlaeger |
| 2015/0133092 A1 | 5/2015 | Shaffer et al. |
| 2015/0172439 A1* | 6/2015 | Yagey .................... H04W 4/12 |
| | | 455/412.2 |
| 2015/0201081 A1 | 7/2015 | Hodge et al. |
| 2015/0201083 A1 | 7/2015 | Olligschlaeger |
| 2015/0281433 A1 | 10/2015 | Gainsboro et al. |

OTHER PUBLICATIONS

R. Cowie, D. Cowie, N. Tsapatsoulis, G. Votsis, S. Kollias, W. Fellenz, and J. G. Taylor. Emotion recognition in human computer interaction. IEEE, Signal Processing Magazine, 2001.

P. J. Durston, M. Farell, D. Attwater, J. Allen, H.-K. J. Kuo, M. Afify, E. Fosler-Lussier, and L. C.-H. Oasis natural language call steering trial. In Proceedings Eurospeech, pp. 1323-1326, Aalborg, Denmark., 2001.

R. Fernandez. A Computational Model for the Automatic Recognition of Affect in Speech. PhD thesis, MIT Media Lab, 2004.

H. Quast. Absolute perceived loudness of speech. Joint Symposium on Neural Computation, 2000.

M. Ringel and J. Hirschberg. Automated Message Prioritization: Making Voicemail Retrieval More Efficient. CHI, 2002.

S. Whittaker, J. Hirschberg, and C. Nakatani. All talk and all action: Strategies for managing voicemail messages. CHI, 1998.

Wellner, P.O.; AT&T Labs.-Res., Red Bank, NJ, USA; Weimer, D.M.; Arons, B.—"Conference Scribe: turning conference calls into documents"—Published in: System Sciences, 2001. Proceedings of the 34th Annual Hawaii International Conference on Date of Conference: Jan. 6-6, 2001—pp. 1-9.

Rohlicek, J.R. ; BBN Systems & Technologies, Cambridge, MA, USA; Ayuso, D.; Bates, M.; Bobrow, R.—"Gisting conversational speech"—Published in: Acoustics, Speech, and Signal Processing, 1992. ICASSP-92., 1992 IEEE International Conference on (vol. 2) Date of Conference: Mar. 23-26, 1992 pp. 113-116 vol. 2.

"Computer programs that react to speech gain real-world use", by Hiawatha Bray, Boston Globe, Jan. 16, 2006.

"Voices of Attraction" by Anmol Madan, Ron Caneel, Alex "SANDY" Pentland MIT Media Laboratory Technical Note No. 584, Sep. 2004.

"Classical and Novel Discriminant Features for Affect Recognition from Speech" by Raul Fernandez & Rosalind W. Picard, Interspeech 2005.

"EARS RTO3S Diarization" by Doug Reynolds, Pedro Torres, Rishi Roy, May 20, 2003.

"Social Signaling in Decision Making" by Ron Caneel, Massachusetts Institute of Technology, Jun. 2005.

"PSTL's Speaker Diarization", by Patrick Nguyen & Jean-Claude Junqua, Panasonic Speech Technology Laboratory (prior to Feb. 27, 2006).

(56) References Cited

OTHER PUBLICATIONS

"Speaker Recognition in a Multi-Speaker Environment" by Alvin F. Martin, Mark A. Przybocki, National Institute of Standards and Technology (prior to Feb. 27, 2006).
"Emotion Detection From Speech to Enrich Multimedia Content" by Feng Yu, Eric Chang, Ying-Qing Xu, Heung-Yeung Shum, Microsoft Research China (prior to Feb. 27, 2006).

* cited by examiner

IDENTICAL CONVERSATION DETECTION METHOD AND APPARATUS

CROSS-REFERENCE TO RELATED APPLICATIONS

This patent application is a continuation in part of U.S. patent application Ser. No. 14/242,026 (Gainsboro, et al., filed Apr. 1, 2014), which is herein incorporated by reference.

FIELD OF THE INVENTION

The field of the invention relates to prison phone systems, automatic monitoring of phone calls, detection of prohibited telephonic communication, audio data mining, criminal investigation, centralized criminal voice databases, and more specifically to automated detection of prison inmates contacting other prison inmates by telephone.

BACKGROUND OF THE INVENTION

As the hardware and software to record conversations in digital form has become more and more affordable over recent years, recording and archiving of conversations such as customer service calls, teleclasses, business teleconferences, and calls made by prison inmates has become routine. As digital voice recorders have become more economical and easier to use, their use for dictation and note taking has been steadily increasing. It is expected that with the increasing availability of portable digital devices capable of audio recording (such as MP3 player/recorders, cell phones, and digital voice recorders) the amount of conversations digitally recorded each year will continue to increase for many years to come, and that the uses of digital audio recording devices will continue to expand. Indeed, we are approaching the time when audio recording of one's entire lifetime experience will be practical and economical. As the amount of monitored and stored audio data increases, there is an ever increasing need for technological tools which can extract information from digital audio data. Background information on a number of conversation-recording market segments, as well as background information on speech, voice verification, and voice identification is presented below.

Prison Market

Modern correctional institutions face many challenges concerning phone calls made by inmates. One intent of correctional institutions is to restrict inmates from making phone calls to persons they should not be contacting. To help accomplish this aim, many modern prison phone systems (also referred to as Inmate Calling Systems, or ICS) require inmates to use an identifying PIN to use the phone system, and the phone system enforces limitations on numbers which can be directly dialed, based on the prisoner's individual PIN. Many prison phone systems, for instance, limit a given prisoner to dialing one of a pre-approved set of phone numbers when making calls. One example of the type of phone call inmates are not allowed to make is phone calls to other convicted criminals (either in other prisons, or out on parole). Another example of the type of phone call inmates are not allowed to make is phone calls which threaten, intimidate, or harass someone. There is a need for innovative technologies that can help law enforcement officials quickly and easily identify with a high degree of accuracy inmates who are making phone calls to individuals who do not want to receive such phone calls.

Even if review of a recorded phone call allows prison officials to determine that a prisoner threatened or intimidated someone over the phone, if the person who was threatened or intimidated was not at the number the inmate dialed (because, for instance, the number the inmate dialed was set to forward to a different number), the identity of the person who was threatened or intimidated may not be known to investigators. There is a need for innovative technologies which enable law enforcement officials to identify individuals who have receive prohibited calls from inmates.

Another type of phone call prisoners have occasionally made which has embarrassed officials is a phone call to a public radio station, where the prisoner winds up speaking on the radio without authorization. One way in which inmates circumvent the limited-dialing restrictions of modern prison phone systems is to make a phone call to an "allowed party", who has invited over to his or her residence a "disallowed party", who then participates in the phone call after the phone is initially answered by the allowed party. Another way in which inmates circumvent the limited-dialing restrictions of modern prison phone systems is to make a phone call to a friend who has three-way calling, and then have that friend conference in a person at another telephone number (which is not approved for the prisoner to be dialing). Another way that inmates circumvent dialing limitations is to have someone at an allowed number set his or her phone to call-forward to another number (which is not approved for the prisoner to be dialing). At one US prison, investigators have found an instance of a prisoner participating in a conference call with other incarcerated criminals on a publicly accessible telephone bridge line, to which his call was forwarded by someone he was allowed to be dialing. There is a need for innovative technologies which can quickly and reliably detect telecommunication between multiple incarcerated individuals. Since such individuals may be incarcerated in different states, and state laws govern the recording of conversations and the use of recorded conversations, there is a further need for innovative methods of detecting inmate-to-inmate calls between prisons, without violating state laws and institutional regulations regarding recordings of conversations.

One brand of prison phone systems boasts a "third-party-call-indicating click detector" feature, which is designed to detect a set of supposedly telltale click sounds on the line when a third party is conferenced on to the line. Such detectors are unfortunately unreliable at best, because many modern telephone systems don't create any particular noises on the line when conferencing in a third party, or when forwarding a call to another number, but none the less, prison officials have been motivated by the promise of such systems enough to purchase phone system upgrades. Indeed, word of the existence of such systems has spread among inmates, along with the belief and story that if inmates in a conversation (where a third party is being conferenced in, or where a call is forwarded) are making enough noise at the time of the conferencing clicks, then the system will not detect the clicks.

To continue to market "conference call click detecting" systems to prisons in the face of such stories, manufacturers of such systems have utilized phone system hardware that separates the electronic signals produced by the phone the inmate is talking on at the prison, from the electronic signals coming in from the outside phone network. Telecommunications with the incoming and outgoing signals separated is sometimes referred to as four-wire telephony (in contrast to the two-wire telephony systems typically used in homes, where incoming and outgoing signals share the same pair of wires). We will also refer to this four-wire technique in this document as "telephonic directional separation". When click detection algorithms are run on only the signals coming in from the outside phone network, clicks can be detected (if they exist) regardless of how much noise a prisoner makes on a phone at the prison. In addition to click detection methods, tone detection methods such as those described in U.S. Pat. No. 5,926,533 (which is herein incorporated by reference) are known in the art. However, if a given outside phone system accomplishes call conferencing or forwarding without creating clicks or tones, the call conferencing or forwarding can not be detected through click or tone detection. There is a need for innovative technology which can detect conference calls in situations where no tell-tale clicks or tones are present. There is a further need for innovative technology which identifies with a high degree of certainty multiple individuals taking part in a conference call.

A compounding problem facing corrections facilities today is that detecting and automatically disconnecting a call based on the fact that it is a conference call or a forwarded call may not be the right thing to do in some circumstances. For instance, if someone an inmate is allowed to call at home sets his home phone to forward to his cell phone if he doesn't answer at home, the call should be allowed to go through. Likewise, if one person an inmate is allowed to call wants to conference in another person that the inmate is allowed to call, such a call should not be automatically disconnected. There is a need for innovative technology which will not interrupt conference calls and forwarded calls which should be allowed to take place, while automatically disconnecting instances of call forwarding and conference calling which should not be allowed to take place.

The quantity of phone calls made on a daily basis from modern correctional institutions is large, and even though many correctional institutions record all phone calls made by inmates, it is a financially infeasible task to manually review, spot monitor, or manually spot review all phone calls made, and even if such manual monitoring were feasible, persons monitoring the calls would be unlikely to know if a given call was forwarded to someone at a different number than the number that was dialed, and the entire call might have to be listened to in order to detect an instance of conferencing in a third party. There is a need for more automated monitoring with innovative features which would statistically allow a high degree of accuracy in pinpointing phone calls which went to an un-allowed party.

Even when inmates are talking to allowed parties, it is desirable to prevent inmates from facilitating illegal activity via their phone calls. Techniques (such as described in U.S. Pat. No. 6,064,963, which is herein incorporated by reference) are known in the art for automatically spotting key words in conversations. Unfortunately it can be difficult to know what key words to look for, because inmates know that all their calls are being recorded, so they may be unlikely to speak about prohibited subjects in a directly obvious manner. Even if prison officials reviewed all of every phone call made, it would be challenging to figure out the meaning of what was being said if part or all of the conversation were essentially in code. There is a need for technological advances which can aid prison officials in detecting phone calls about prohibited subjects, and there is a need for technological advances which can provide prison officials with clues to help decipher conversations which are partly "in code".

Correctional institutions are not only responsible for preventing inmates from engaging in illegal and/or harmful activities, they are also charged with rehabilitating inmates. One key factor which can aid in rehabilitating inmates is monitoring each prisoner's psychological state of mind. Monitoring inmates' phone calls can give excellent clues to inmates' states of mind, but prisons don't have the budget to have even unskilled personnel monitor the majority of phone calls made, and the level of training and attentiveness that would be required to monitor the majority of phone calls and keep psychological notes is not reasonably feasible for prisons to expend. There is a need for innovative technology and automated systems to help prison officials track the psychological states of mind of inmates.

Another challenge facing prison officials is the challenge of maintaining certainty about who is making which calls. Although many modern prison phone systems require a prisoner to enter a PIN to make calls, it is still possible for inmates to share PINs with each other, which gives them access to dialing numbers which are not on their "allowed phone number" list. There is a need for more reliable ways for prison officials to be able to detect when inmates are directly dialing non-allowed phone numbers by using identifying information of other inmates. It has been proposed to use digital signal processing Speaker Identification techniques (such as those described in U.S. Pat. No. 6,519,561, which is herein incorporated by reference) in place of PINs to identify which inmate is making a call, but speaker identification technology is nowhere near as reliable as fingerprinting, so such an identification system has not been deemed a viable substitute for PINs.

Sometimes officials may deem it more helpful to detect illegal activities over the phone system, and rather than interrupt such activity at the time it takes place, gather evidence from such activity to expand criminal investigations in order to catch and convict more criminals who have not yet been detected or apprehended.

Speaker recognition technology relies on extracting from human speech certain characteristics of the fundamental vibration rate of the speaker's vocal chords, and certain information about the resonances of various parts of the vocal tract of the person speaking, which are indicative of the physiology of that particular person's vocal tract. There are two problems that lead voiceprints to be far less individuated than fingerprints. The first problem is that there is not as much variation in the physiology of typical people's vocal tracts to provide as rich a differentiation as fingerprints provide. The second problem is that each given person's vocal tract characteristics vary in a number of ways depending on time of day, how much the person has been talking that day and how loud, whether or not the person has a cold, etc.

Some modern prison phone systems use voice verification in conjunction with PINs, to make it more difficult for one inmate to falsely identify himself as another inmate. Voice verification has less stringent requirements than voice identification. In voice verification, the system is typically simply ensuring that the person speaking a pass phrase has a voice that is "close enough" to the voice characteristics of the person who's PIN is used. Even with voice verification augmenting PIN usage, one inmate might "share his identity" with another inmate, by entering his PIN and speaking his pass phrase, and then handing the phone off to another inmate. Or an inmate may use a pocket dictation recorder to record another inmate's pass phrase, and then play it into the phone at the appropriate time. There is a need for more robust inmate identification technology which prevents one inmate from "handing off" his identity to another inmate in a way that would allow the other inmate to make calls to numbers which he would otherwise not be allowed to call.

The only data most modern prison phone systems keep track of and make easily searchable are records of numbers dialed, and time, date, and duration of calls, inmate who originated the call, reason for call termination (regular termination, 3-way call termination, out-of-money, etc.), type of call (collect, prepaid, debit, etc.). There is a need for innovative tracking metrics which allow prison officials to more accurately pinpoint which call recordings are worthy of human review, and speech-to-text technologies only partially address this need. It may for instance be desirable to detect when an inmate is giving orders or threatening someone. This may be difficult to do from vocabulary alone, especially since the prisoner knows the call is being monitored, and may therefore speak "in code". There is also a need for innovative technologies which offer real-time detection of prohibited calls (through detection of non-allowed call participants, and/or through the nature of the dialog between the inmate and the called party or parties), and there is the need for a system which offers prison officials the opportunity to quickly make a decision in real time as to whether a given call should be interrupted, and interrupt the phone call if needed based on real-time content of the call.

Speech Processing

Computational techniques of converting spoken words to text or phonemes (speech recognition), and techniques for identifying a person by voice automatically (speaker identification) and techniques for automatically verifying that a particular person is speaking (speaker verification) typically employ techniques such as spectrographic analysis to extract key features of different people's voices. The following two paragraphs are included to familiarize the unfamiliar reader with some terms and graphical representations used in spectrographic analysis.

A black & white spectrogram of the utterance "phonetician" (the time-domain waveform of which is shown in FIG. 2 is shown in FIG. 3. The spectrogram may be thought of as being composed of a set of vertical stripes of varying lightness/darkness. Each vertical stripe may be thought of as representative of the frequency vs. amplitude spectrum resulting from a Fourier transform of a short time window of the time-domain waveform used to derive the spectrogram. For instance, the spectrum of a short time segment starting 0.15 seconds into the utterance who's spectrogram is depicted in FIG. 3 (representing the spectrum of the beginning of the "o" vowel in "phonetician") may be represented either by the graph in FIG. 4 or by the vertical stripe 300 of the spectrogram in FIG. 3. The dark bands of vertical stripe 300 may be thought of as representing the peaks of the spectrum in FIG. 4. Thus a spectrogram represents a series of spectral snapshots across a span of time. An alternative way of representing a spectrogram is shown in FIG. 6, where the sequential time segments are assembled in a perspective view to appear as a three-dimensional landscape.

The peaks in the spectrum in FIG. 4 (or equivalently, the dark bands in stripe 300) are referred to as the formants of speech. These peaks fall on harmonics of the fundamental vibration rate of the vocal chords as the speaker pronounces different utterances, and their relative heights and how those relative heights change throughout speech are indicative of the physiology of the particular speaker's vocal tract. Both the fundamental vibration rate of the vocal chords (shown in FIG. 3 over the time span of the utterance of FIGS. 2 and 6) and the relative amplitudes of the speech formants vary over time as any given speaker speaks. Speaker recognition and speaker verification utilize the differences between the spectral characteristics (including variations over time and different utterances) of different peoples voices to determine the likelihood that a particular person is speaking. Various techniques are known in the art for extracting from a speech sample spectral data which may be viewed as indicative of identifying characteristics of the speaking person's vocal tract. Such data is commonly referred to as a voice print or voice signature. The fundamental vibration rate of a given person's vocal chords (and certain other geometric characteristics of that person's vocal tract) can and often do vary with time of day, length of time the person has been continuously talking, state of health, etc. Thus voiceprints are not as invariant as finger prints.

Speech recognition technologies for use in such applications as speech-to-text conversion have been commercially available in products such as Dragon Naturally Speaking™ (made by Nuance Communications Inc.) and ViaVoice™ (made by IBM) for a number of years now, and recently researchers have also begun to develop software for recognizing the emotional content of speech. The word prosody (defined at Princeton University as "the patterns of stress and intonation in a language") is often used in the field of affective computing (computing relating to emotion) to refer to emotion-indicating characteristics of speech. Prosody measurements may include detecting such speech characteristics as word rate within speech, perceived loudness, sadness, happiness, formality, excitement, calm, etc. Perceived loudness is distinguished here from absolute loudness by the way the character of someone's voice changes when he or she yells as opposed to talking normally. Even if someone used a "yelling voice" quietly, one would be able to understand that the voice had the character of "yelling". Within this document, we will expand the meaning of the word prosody to include all non-vocabulary-based content of speech, including all emotional tonal indications within speech, all timing characteristics of speech (both within a given person's speech, and timing between one person in a conversations stopping speaking and another person in the conversation speaking), laughter, crying, accentuated inhalations and exhalations, and speaking methods such as singing and whispering. References in which the reader may learn more about the state of the art in prosody detection include:

1) MIT Media Lab Technical Report No. 585, January 2005, which appeared in Intelligent user Interfaces (IUI 05), 2005, San Diego, Calif., USA.
2) R. Cowie, D. Cowie, N. Tsapatsoulis, G. Votsis, S. Kollias, W. Fellenz, and J. G. Taylor. Emotion recognition in human computer interaction. IEEE, Signal Processing Magazine, 2001.
3) P. J. Durston, M. Farell, D. Attwater, J. Allen, H.-K. J. Kuo, M. Afify, E. Fosler-Lussier, and L. C.-H. Oasis natural language call steering trial. In Proceedings Eurospeech, pages 1323-1326, Aalborg, Denmark, 2001.
4) R. Fernandez. A Computational Model for the Automatic Recognition of Affect In Speech. PhD thesis, MIT Media Lab, 2004.
5) H. Quast. Absolute perceived loudness of speech. Joint Symposium on Neural Computation, 2000.
6) M. Ringel and J. Hirschberg. Automated message prioritization: Making voicemail retrieval more efficient. CHI, 2002.
7) S. Whittaker, J. Hirschberg, and C. Nakatani. All talk and all action: Strategies for managing voicemail messages. CHI, 1998.

The above references are herein incorporated by reference.

Within this document, the terms "voice print", "voice signature", "voice print data", and "voice signature data"

may all be used interchangeably to refer to data derived from processing speech of a given person, where the derived data may be considered indicative of characteristics of the vocal tract of the person speaking. The terms "speaker identification" and "voice identification" may be used interchangeably in this document to refer to the process of identifying which person out of a number of people a particular speech segment comes from. The terms "voice verification" and "speaker verification" are used interchangeably in this document to refer to the process of processing a speech segment and determining the likelihood that that speech segment was spoken by a particular person. The terms "voice recognition" and "speaker recognition" may be used interchangeably within this document to refer to either voice identification or voice verification.

In order for the voice of a given person to be identified or verified in voice identification processes, a sample of that person's speech must be used to create reference data. This process is commonly referred to as enrollment, and the first time a person provides a speech sample is commonly referred to as that person enrolling in the system.

There are several ways that voice recognition algorithms can be thought of as testing a given person's voice to see if it matches a previously stored voice print. The first way is that the voice print data can be thought of as a numerical vector derived from the reference speaker's voice. A second numerical vector can be derived in a like manner from the voice under test, and a numerical algorithm can be used to compare the two vectors in a way where the comparison produces a single number that has been found to be indicative of the likelihood of a correct match.

Since the absolute likelihood of a correct match is not independent of the voices of all the people who might be tested who are not a match, a more useful method compares the voice signature of the person being tested to voice signatures from a number of other individuals, or to an average voice signature derived from a number of people. The likelihood that the voice signature under test is the voice that was used to derive the reference voice signature is then derived from the extent to which the voice signature under test matches the reference voice signature better than it matches other individual voice signatures, or the extent to which the voice signature under test matches the reference voice signature better than it matches the "average" voice signature of a population.

A third way that voice recognition algorithms can be thought of as testing a given person's voice to see if it matches a previously stored voice print is that the stored voice print may be thought of as a model which is repeatedly tested against over time using small samples of the voice under test, and the resulting test scores are averaged over time. This procedure may be used with one of the above methods to produce a likelihood score which has more certainty the longer the speech under test is listened to. This variable sample length method may have advantages in live monitoring applications and in applications where it is desirable not to waste computational resources once a desired certainty level has been attained.

SUMMARY OF THE INVENTION

It is an object of the present invention to provide a method and apparatus for detecting past or real-time instances of real-time telecommunication between multiple prison inmates (such as multiple inmates participating in a 3-way call or conference call). It is a further object of the present invention to provide a method and apparatus for detecting real-time or past instances of delayed telecommunication between inmates, such as one inmate retrieving a voice mail message left by another inmate. It is a further object of the present invention to provide a method and apparatus for reliably detecting phone calls between multiple inmates for an insignificant cost over present prison phone systems. It is a further object of the present invention to provide a method and apparatus capable of providing proof of telecommunication between a plurality of individuals, without recording the conversation between those individuals. It is a further object of the present invention to provide a method and apparatus for detecting instances of a given teleconference being monitored by multiple agencies, individuals, or institutions, without those agencies, individuals, or institutions having to share with each other the content of any monitored teleconference, and in a way that complies with all federal, state, and institutional regulations regarding transmitting live or recorded phone data between facilities and/or between multiple states.

It is a further object of the present invention to provide a method and apparatus that can help law enforcement officials quickly and easily identify with a high degree of accuracy inmates who are making phone calls to individuals who do not want to receive such phone calls. It is a further object of the present invention to provide a method and apparatus that can enable law enforcement officials to identify individuals who have receive prohibited calls from inmates. It is a further object of the present invention to provide a method and apparatus that can detect conference calls in situations where no tell-tale clicks or tones are present.

It is a further object of the present invention to provide a method and apparatus that can aid in automatically disconnecting instances of call forwarding and conference calling which should not be allowed to take place. It is a further object of the present invention to provide a method and apparatus that facilitates identifying with a high degree of accuracy phone calls which went to an un-allowed party. It is a further object of the present invention to provide a method and apparatus that provides metrics which allow prison officials to more accurately pinpoint which call recordings are worthy of human review. It is a further object of the present invention to provide a method and apparatus that allows persons reviewing audio recordings of classroom sessions, teleconferences, meetings and the like to more rapidly find the portions of the recording that may be of most relevance or interest.

In its simplest embodiment, the present invention detects multiple inmates participating on a conference call together, by maintaining a central database of numbers dialed, time the number was dialed, and length of call, searching the database for time-overlapping phone calls to a common number, and either flagging records of such calls in the centralized database or a separate call record database, and displaying such flagged records later to a person seeking to investigate three-way calls, and/or alerting a call-control official in real time when such time-overlapping calls are detected. An embodiment utilizing a centralized database that receives call time & duration records from more than one prison enables detection of organized crime activities that could not be detected from within either prison's phone system alone. This simple method does not work if call forwarding is involved in bridging or conferencing calls.

In one aspect, a more sophisticated embodiment of the present invention creates separate signature vectors from each of a number of past recorded phone calls. In a preferred embodiment, each call signature (also referred to herein as a signature vector, signature data or data-reduced data set) comprises a much smaller set of data than the digital recorded phone call data from which it is made, and no intelligible audio data can be reconstructed from signature data, so call signature data according to a preferred embodiment of the present invention does not legally comprise a recording of the phone call from which the signature data is derived, and thus call signature data according to the present invention is not regulated by laws and regulations which regulate call recordings.

In one preferred embodiment, a data-reduced data set comprises data chunks representing the timing of sequences of sounds within a phone conversation. In a simpler embodiment, a data-reduced data set comprises dialed number identification, and call timing information, such as call start time and call duration, call start time and call end time, call end time and call duration, or any pair of such numbers sufficient to identify the span of time during which a call was active. In such a simpler embodiment, calls which may have been bridged together into a forbidden three-way call are detected by detecting situations where multiple inmates made separate calls to the same phone number, and those separate calls overlapped in time, indicating the calls may have been conferenced together by hand (by the dialed party employing three-way calling or call conferencing features), or automatically (if the dialed number is that of an automated call-conferencing bridge).

In an alternate simplified embodiment, multiple start times are stored for each call, for instance the time at which the call was placed, and the time (if any) when the inmate and the called party are first allowed to hear each other on the call. This is done because inmate calling systems sometimes play a recorded announcement to the called party and require an affirmative response from the called party before allowing the inmate and the called party to hear each other on the line. We shall herein refer to as the "call conversation time" the part of the call when at least one of the called and calling parties can hear the other on the line because at least one direction of communication is not blocked during that time by the inmate calling system.

In a preferred embodiment, each signature vector (generated from a phone call between multiple persons speaking to each other on multiple phones) is created from a non-channelized (monaural, non-diarized) recording of a phone call, in a manner which produces the same signature vector independent of which phone (of the multiple phones between which the conversation takes place) the recording is made at. Thus, if person 1 (speaking on phone 1) and person 2 (speaking on phone 2) are involved in a phone call, even if a recording made at phone 2 gave a different amplitude and/or frequency weighting to speech from person 1 relative to person 2 than a recording made at phone 2, the method and apparatus of the present invention would produce an identical call signature from a recording made at phone 1 as it would from a recording made at phone 2. In a preferred embodiment, when quantization error or differences in signal at phone 1 and phone 2 would produce different signatures when the method and apparatus of the present invention are applied to digital audio signals from phone 1 and phone 2, the different signatures are numerically close to one another. For instance, if there is a difference in the ratio of the amplitudes of the signal components due to the person speaking into phone 1 versus the amplitudes of the signal components due to the person speaking at phone 2, or if there is a difference in the placement of time segment boundaries of a recording made during processing of a recording made at phone 1 versus time segment boundaries made in a recording made at phone 2, or if there is a difference in the shaping of the frequency spectrum of signals from phone 1 in a recording made at phone 1 versus phone 2, and the result of such differences is that the signature data derived from a recording made at phone 1 is different from signature data derived from a recording made at phone 2, then in a preferred embodiment of the present invention, such signature data is derived in such a way that such two sets of signature data are easily seen to be "close" to one another.

In one preferred embodiment, this desired "closeness" of signatures (produced from two very similar but different recordings produced by recording the same conversation at both phone 1 and phone 2) may be determined by running a correlation function on the data set of signature 1 with the data set of signature 2, and the output of the correlation function will give a numerical measure of how similar the two signatures are. In a preferred embodiment, the correlation of signature 1 with signature 2 will produce a number which is as good or better at measuring the similarity of recording 1 to recording 2 than a number produced by running a correlation function on the raw digital recording data of recording 1 with the raw digital recording data of recording 2. Additionally, because the signature data sets derived from recordings 1 and 2 are much smaller than the original digital recording data of recordings 1 and 2, computing the correlation function of signals 1 and 2 takes much less computational bandwidth and is therefore much less costly than computing the correlation function of entire digital recordings 1 and 2.

In another aspect, the present invention produces time-segmented call signature data, such that if two call signatures were produced from two phone calls which were conferenced together for a time which represented only a subset of the time span over which each call took place, the portion of the call signature data produced from time segments within the overlap time would be identical.

In another aspect, the present invention provides a computationally efficient means for comparing time-segmented call signature data, by storing time-segmented signature data in an indexed fashion, such that any call that contains a segment signature identical to a given segment signature can quickly be found, and it can quickly be verified if subsequent segment signatures from two calls being compared also match, and thus it may rapidly be determined which sub-sections of two calls were conferenced together (or which sub-section of a call comprises a retrieval of a voice mail message left on another call whose signature is known).

In another aspect, a preferred embodiment of the present invention makes use of absolute time data regarding multiple phone call recordings, to limit the signature data searched for matching calls, such that the signature data searched for conferenced calls is limited to signature data generated from calls which overlapped in time, and the signature data searched for voice mail messages left on one phone call and retrieved on another is limited to a span of time deemed to be the longest time later it might be useful to retrieve a voice mail after it is left.

In a preferred embodiment of the present invention, the time boundaries used to segment call signature data are derived from features within the recorded audio data from which the signature is being derived, rather than absolute time.

In an alternate preferred embodiment of the present invention, individuals who have received undesired phone calls or fear they may receive undesired phone calls (for instance, harassing phone calls from an inmate in a prison)

may install a call-signature-generating device according to the present invention at their residence, connected to their phone line. In a preferred embodiment, the call-signature-generating hardware device will contain analog-to-digital converter means, digital signal processing means, and wired or wireless networking means to allow the call signatures generated to be transmitted over the internet to another location. In a preferred embodiment, the call-signature-generating device runs software and/or firmware which automatically detects a telephone off-hook condition and generates a digital call signature vector for each phone call received, and/or each phone call originated on the phone line to which the call-signature-generating device is connected.

In a preferred embodiment, call signatures generated at prisons for calls made by all prisoners, and call signatures generated in homes are all sent to a central processing facility, and signature matches are automatically detected, thus facilitating the rapid identification of who the recipients of unwanted and/or illegal phone calls are.

In an alternate preferred embodiment, a call-signature-generating device as described above may be configured to automatically generate a call signature from each phone call monitored by a court-ordered and/or government-installed wire tap. Call signatures may be sent to a central facility without compromising security of any wire tapping operation, and without violating any state or federal laws about recording conversations and communicating or transmitting such recordings, because the content of a given conversation cannot be reconstructed from its associated call signature data vector. Thus, a central facility according to one aspect of the present invention can provide subscribing organizations (such as prisons, the FBI, the Department of Homeland Security, etc.) a service by letting subscribers know about situations where identical or overlapping call signatures are detected by different agencies, institutions, or a combination of an agency or institution and a private residence or private corporation. Within this document, the term "overlapping call signatures" will denote call signatures which were generated from two phone calls, where some overlapping temporal portion of the two phone calls were identical. Overlapping call signatures would be generated (for instance) by two two-person telephone conversations which were briefly bridged into a single four-person teleconference.

It is a further object of the present invention to facilitate data-sharing between federal agencies, by detecting situations where multiple agencies wind up monitoring identical or overlapping phone calls.

DETAILED DESCRIPTIONS OF SOME PREFERRED EMBODIMENTS

Figure 7:
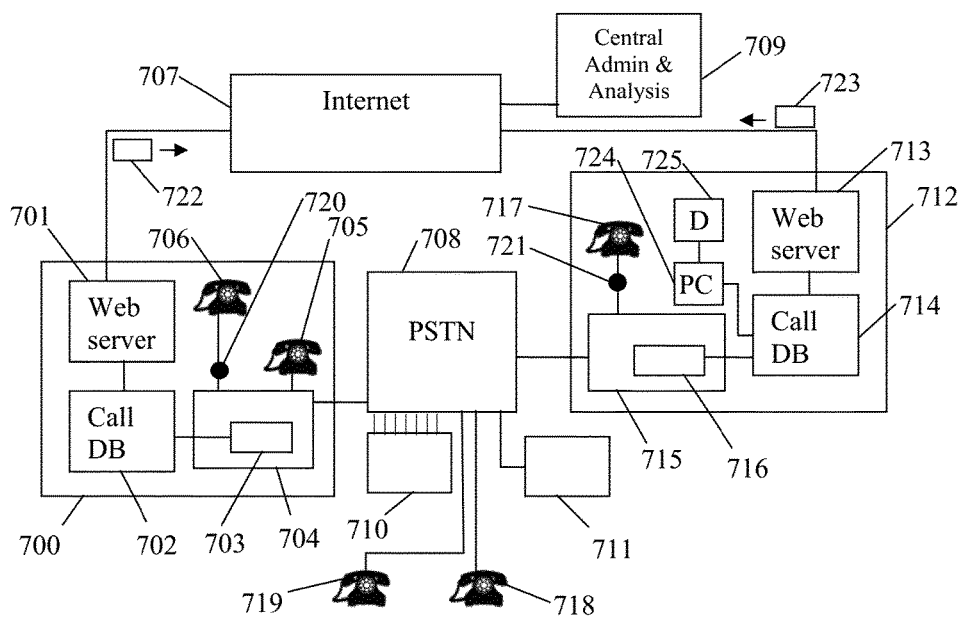
FIG. 7 is a high-level block diagram of the apparatus of a preferred embodiment of the present invention, including telecommunications and internet connections between hardware installations at multiple institutions.

FIG. 7 is a high-level block diagram of the apparatus of the present invention, including telecommunications and internet connections between hardware installations at multiple institutions. Hardware on premises at institution 700 includes web server 701, recorded call database 702, telecommunications system 704 (including call recording system 703), and inmate telephones 705 and 706 (which are herein assumed to be in different cell blocks of a prison, such that prisoners with access to one of these phones might not be allowed to come in contact with prisoners who have access to the other phone). Hardware on premises at correctional facility 712 includes web server 713, recorded call database 714, telecommunications system 715 (including call recording system 716), and inmate telephone 717. Within facility 712, calls during which inmates are suspected to have participated in forbidden three-way calls or conference calls are indicated on display 725 by computer 724, which accesses call log database 714. In different embodiments, display 725 may be a computer monitor, a printout, a cell phone or other mobile device display, a voice output device, or any other means for displaying data to users as may be known in the art.

Figure 17:
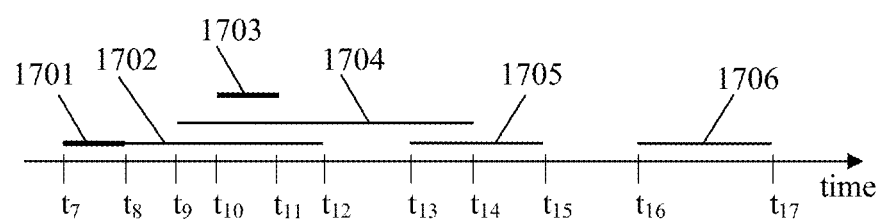
FIG. 17 depicts timing relationships between five different phone calls placed to the same phone number

FIG. 17 shows the timing relationships between five different phone calls (made from five different prison phones) to the same phone number. Phone call 1 (comprising timespans 1701 and 1702) is answered at time $t_7$ and goes until time $t_{12}$, but from time $t_7$ to time $t_8$, the calling and called parties have not yet been connected, because the inmate calling system of the facility from which phone call 1 is placed requires verification from the called party before the called party and the calling party are connected at time $t_8$, thus during time span 1701, there is no communication between the parties. Phone call 2 (comprising time span 1704) is placed in a manner not requiring called party verification, and is answered at time $t_9$.

Phone call 3 (comprising time span 1703) is placed through an ICS requiring called-party verification, and the called party does not provide the proper verification, so although phone call 3 is answered at time $t_{10}$ and does not end until time $t_{11}$, the calling inmate and the called party are never able to speak with one another. Phone call 4 (comprising time span 1705) and phone call 5 (comprising time span 1706) are placed through an ICS not requiring called-party verification, and take place over time spans 1705 (from time $t_{13}$ to time $t_{15}$) and 1706 (from time $t_{16}$ to $t_{17}$), respectively.

A preferred embodiment of the present invention flags each of phone calls 1 and 2 as having been conferenced together through the called party from time $t_9$ to time $t_{12}$ (where time spans 1702 and 1704 overlap), and flags phone calls 2 and 4 as having been conferenced together through the called party between times $t_{13}$ and $t_{14}$ (where time spans 1704 and 1705 overlap). Call 6 to the called party (taking place over time span 1706) is not flagged as a conference call, because it does not have time-overlap with any of the other calls. Call 3 is flagged as a possible attempted conference call, but is not flagged as a conference call because although it has time overlap with calls 1 and 2, the calling party was never connected to the called party, so no conversation took place.

As can be seen in FIG. 17, two phone calls overlap in time when the beginning of both phone calls occur before the ends of either phone call, and two phone calls do not overlap in time when one phone call has ended before the other phone call begins. In a preferred embodiment, for the purposes of the present invention (as for common phone call billing practices), the start time stored for a phone call between two parties is the time when the call is answered by the called party, not when the caller begins dialing. For the purposes of the present invention (as for common phone call billing practices), a phone call end time stored for a given calling party is the time when such calling party hangs up or becomes disconnected.

If a particular inmate calling system stores only dialing start time and does not store conversation start time or the time the call is answered, the conversation start time will be approximated as the dialing start time. If a particular inmate calling system stores the time a call was answered, but not the time within the call when the called party and the calling inmate are first allowed to hear each other (conversation start time), then the present invention will approximate conversation start time as the time the call was answered. In a preferred embodiment, if an inmate calling system with which the present invention is used stores call start and end times in a coarsely quantized fashion (for instance minutes instead of seconds), the present invention will assume that the call or conversation started at the previous quantized time point and ended at the next quantized time point from those points stored, to be sure to indicate the possible existence of all possible 3-way calls that may have been detectable through the present invention. In embodiments where the centralized database of the present invention stores data concerning calls made from multiple facilities, the centralized database may be housed within centralized analysis facility 709, and any time misalignment between the time stamps of call records at different facilities is also stored and accounted for in determining whether calls made from multiple facilities (and/or the conversation portions of those calls) overlap in time. In embodiments where the centralized database of the present invention stores data concerning phone calls made from only one facility, the centralized database of the present invention may be part of the database of the inmate calling system of that facility.

In one aspect, the present invention serves to detect instances where substantially identical portions of audio are contained within multiple call recordings and/or live calls. Within this document, the term "substantially identical" shall be construed to mean sections of calls which were monitored live or recorded at at least two different locations, where the audio recorded or monitored at the different monitor points are identical enough such that a human listener listening to the two calls would recognize that he or she is listening to the identical phone call, even if the amplitude and/or phase of the frequency spectrum of sound from one participant in such a call when monitored at a first monitor point is different from the amplitude and/or phase of the frequency spectrum of sound from that participant when the call is monitored at the second monitor point.

Figure 2:
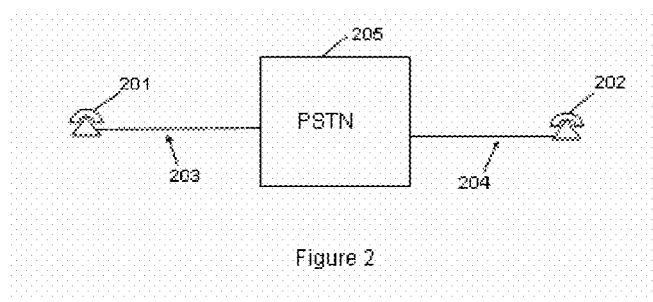
FIG. 2 depicts two telephones connected through the public switched telephone network.
Figure 3:
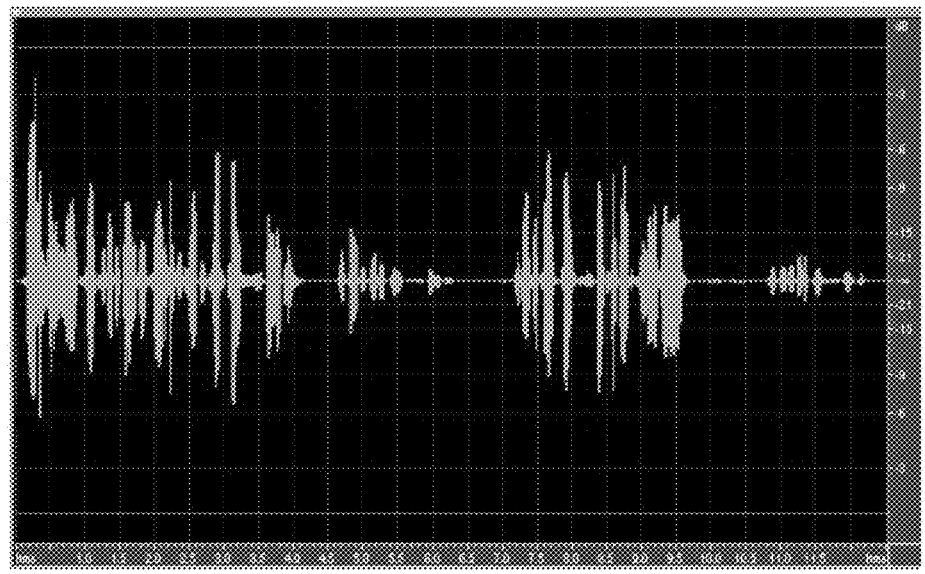
FIG. 3 is a time domain representation of an audio recording of a phone call between someone at phone 201 and someone at phone 202, where the recording is made at phone 201.
Figure 4:
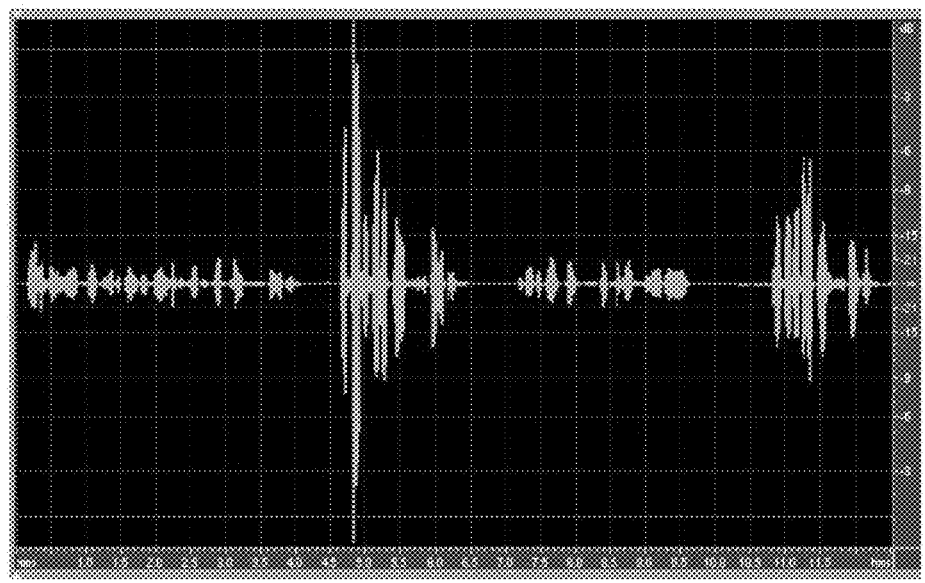
FIG. 4 is the time-domain waveform of the same phone conversation shown in FIG. 3, recorded at phone 202.

To understand how different the time-domain waveforms of two recordings of the same conversation may look, we refer first to FIG. 2, which depicts phone 201 connected through public switched telephone network (PSTN) 205 to phone 202. FIGS. 3 and 4 are time-domain waveforms of a 12-second phone call between someone at phone 201 and phone 202. The waveform in FIG. 3 was recorded at two-wire connection 203 at phone 201. The waveform in FIG. 4 was recorded at two-wire connection 204 at phone 202. From the beginning of the conversation until about 4.5 seconds into the conversation, the person at phone 201 is speaking and the person at phone 202 is silent. The signal recorded during this time has about a five times greater amplitude when recorded at phone 201 as compared to when recorded at phone 202. From about 4.5 seconds into the conversation to about 6.5 seconds into the conversation, the person at phone 202 is speaking and the person at phone 201 is silent. The signal recorded during this time has about a five times greater amplitude when recorded at phone 202 as compared to phone 201. It can thus be seen that it is desirable to generate call signature data in a manner that is insensitive to the absolute amplitude of the signal that the call signature data is being derived from.

Similar to the amplitude differences seen in real-time communication being monitored or recorded at two different phones, there can likewise be significant amplitude differences in two recordings of identical audio when the first recording is made when a voice-mail message is left, and the second recording is made when that voice-mail message is later retrieved. One example of such a pair of call recordings would be a first recording of an inmate Fred leaving a voice mail message on voice mail system 711 using phone 706, and that message later being retrieved by inmate John using phone 705 or phone 717.

Another example of such a pair of recorded or live calls would be a phone call made from phone 706 directly to bridge line 710, and a partially time-overlapping phone call made from either phone 705 or phone 717 directly to bridge line 710. Another example of such a pair of recorded or live calls would be a phone call made from phone 706 to phone 719, which has been set to call-forward to bridge line 710, and a partially time-overlapping phone call made from either phone 705 or phone 717 directly to bridge line 710. Another example of such a pair of recorded or live calls would be a phone call made from phone 706 to home phone 719 (here assumed to be allowed to be dialed by the prisoner making the call) where a person at phone 719 conferences in bridge line 710, and a partially time-overlapping phone call made from either phone 705 or phone 717 directly or indirectly to bridge line 710.

Figure 8:
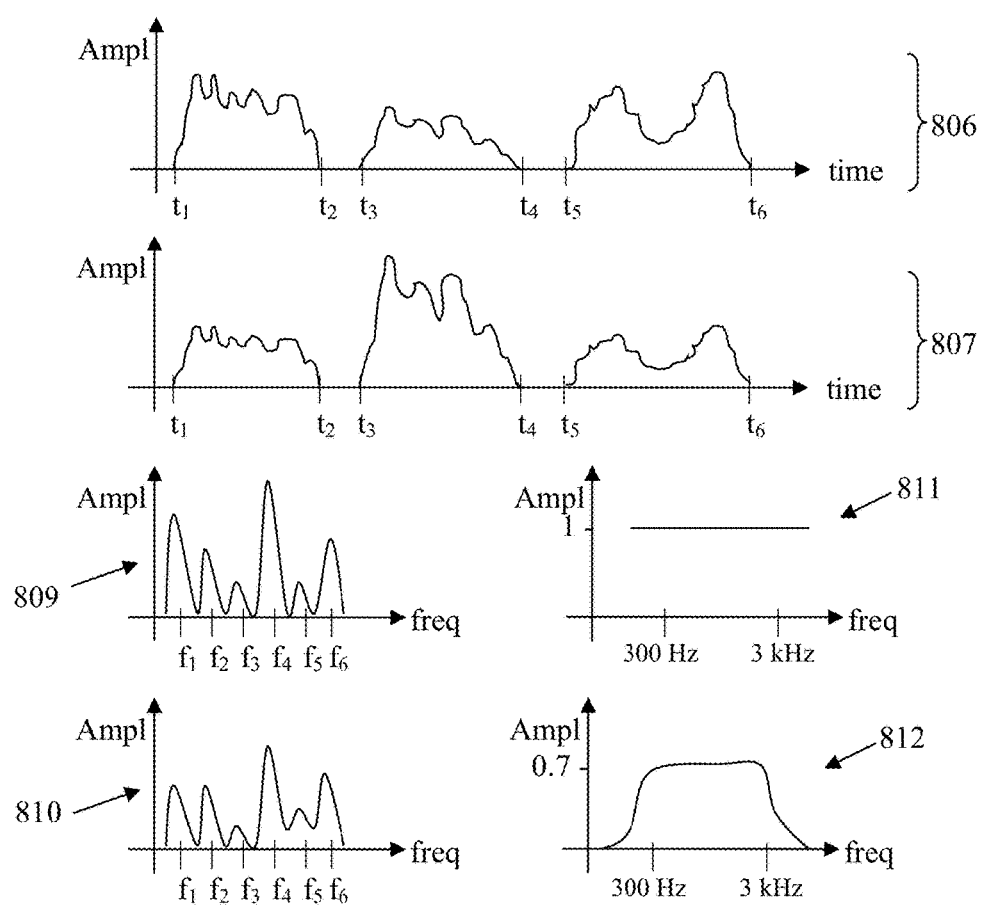
FIG. 8 depicts aspects of a phone call between a person speaking on phone 706, and a person speaking on phone 717, where the two phones are connected via the public switched telephone network (PSTN) 708.

FIG. 8 depicts aspects of a phone call between a person speaking on phone 706, and a person speaking on phone 717, where the two phones are connected via the public switched telephone network (PSTN) 708. Amplitude-time graph 806 represents a recording made at point 720 during the conversation, and amplitude-time graph 807 represents a recording made at point 721 during the conversation. In this example, it will be assumed that the portion of amplitude-time graphs 806 and 807 between times t1 and t2 predominantly represent speech from the person speaking on phone 706, and the portion of amplitude-time graphs 806 and 807 between times t3 and t4 predominantly represent speech from the person speaking on phone 717, and the portion of amplitude-time graphs 806 and 807 between times t5 and t6 predominantly represent speech from the person speaking on phone 706.

In this example it is assumed that PSTN 708 effectively applies a different gain to signals going from phone 706 to phone 717 than it applies to signals going in the opposite direction. Thus we see that speech from phone 717 appears louder with respect to speech from phone 706 in recording 807 than it does in recording 806.

In this example, we also assume that a different frequency-domain transfer function (different spectral shaping) is effectively applied to the audio from phone 706 when recorded at point 720 than is effectively applied to that same audio when it is recorded at point 721. This will typically be true because a 300 Hz to 3000 Hz band pass filter function is typically applied to any audio signals that pass through PSTN 708. In this example we assume that the audio from phone 706, when monitored at point 720 is spectrally shaped by transfer function 811, resulting in frequency spectrum 809, and that same audio when monitored at point 721 is spectrally shaped by transfer function 812, resulting in frequency spectrum 810.

It is assumed that PSTN 708 and telecom systems 703 and 715 behave as linear systems with respect to the audio signals that pass through them. Thus while the overall amplitude ratio of signals from phone 706 vs. signals from phone 717 may be different in recordings made at points 720 and 721, and the spectral components of signals from phone 717 may differ in amplitude in recordings made at points 721 and 720, there are certain characteristics of signals from phone 717 that do not vary between a recording made at point 720 and a recording made at point 721. For instance, if spectral graph 809 is derived from a Fourier transform of a short time segment of recording 806, and spectral time graph 810 is derived from the same time segment taken from recording 807, each of the frequencies f1, f2, f3, f4, f5, and f6 of the spectral peaks in spectrum 809 can be assumed to be almost exactly identical to the frequencies of the analogous peaks in spectrum 810, even though the amplitudes of the peaks are different.

The call recordings depicted in FIGS. 3 and 4 are unrealistically coincident, in that they each last exactly the same length of time and contain only audio from exactly the same span of time of the same conversation. Realistically this would never occur if call recordings included the dialing portion of the call, because the audio at the two (or more) ends of the call are not bridged until after the dialing is over. When 3-way calling or another form of call conferencing is involved in a call, the overlapping portion of two call recordings may occur somewhere part way through each recording, and the length of time into the recordings where the overlapping portion starts may be a different fraction of the length of each recording, and a different absolute amount of time into each recording.

Figure 5:
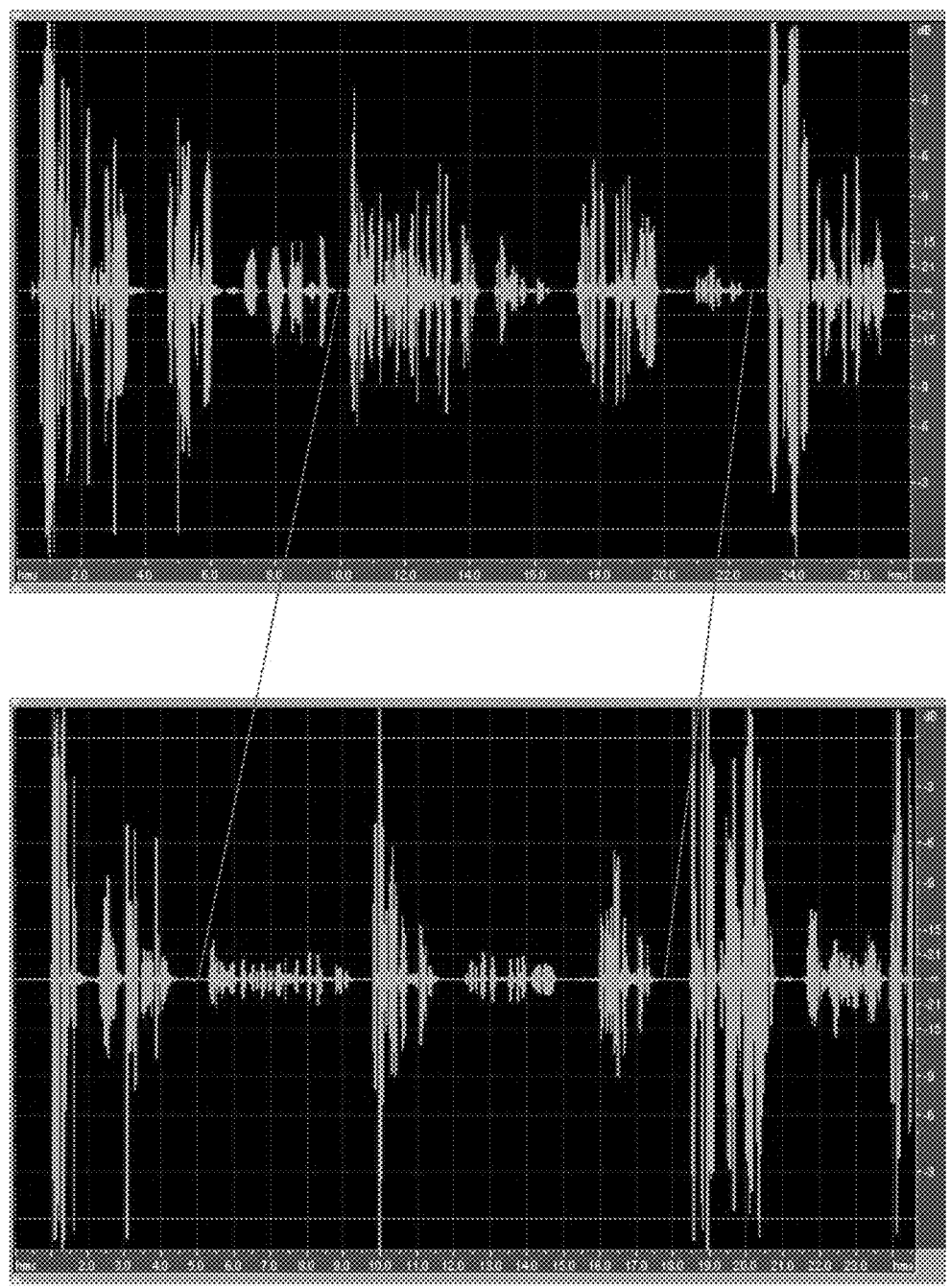
FIG. 5 depicts recordings of two telephone conversations which were bridged for about 12 seconds part way through each call recording.

FIG. 5 depicts recordings of two telephone conversations which were bridged for about 12 seconds part way through each call recording. The audio from 10 seconds into conversation 501 to 22 seconds into recording 501 (identical to the audio in FIG. 3) is the same audio seen from 5 seconds into recording 502 to 17 seconds into recording 502 (identical to the audio in FIG. 4). A preferred embodiment of the present invention facilitates the easy detection of such an overlapping segment of audio in two recordings as shown in FIG. 5, regardless of the differences of amplitude and spectral shaping of the audio spoken at one end of the call but recorded at the other end of the call, and vice versa.

A preferred embodiment of the present invention produces (within web servers 701, and 713, respectively) data-reduced time-correlated data sets 722 and 723 from segments of two calls being monitored live at points 720 and 721, respectively (or two past recorded calls that were recorded at points 720 and 721, respectively), and sends these data-reduced time-correlated sequences via Internet 707 to central analysis server 709, (which in a preferred embodiment includes a centralized database). In a preferred embodiment, these time-correlated data-reduced data sets are produced by an identical algorithm run within facilities 700 and 712, respectively, and this algorithm is of a type that will produce nearly identical data-reduced data sets from calls recorded at points 720 and 721, provided the recordings made at these two points differ mainly in that speech segments from phones 706 and 717 may have undergone different linear transformations as shown in FIG. 32 and explained above. Within this document, such a reduced data set will be referred to as a recording-point-invariant data set.

One example of such a data reduction algorithm is the detection of the time centers of all the vowel sounds recorded over a period of time. Each vowel sound is produced by the vibration of the vocal folds (vocal chords) of the person speaking at the time, where the vocal tract of that person is shaped in such a way as to produce a multi-peaked spectrum such as the spectrum shown in FIG. 9.

Another example of such a data reduction algorithm consists of diarizing each recording into segments of speech produced by different call participants, and producing a data-reduced data set consisting of absolute and/or differential time boundaries of such diarized speech segments, according to methods described in U.S. patent application Ser. No. 11/475,541, and provisional patent applications 60/897,154, 60/930,425, 60/994,707, 61/004,431, and 61/135,827, which are herein incorporated by reference. Another example of such a data reduction algorithm consists of such differential or absolute time boundaries combined with voice print data, voice print code book data, speech mannerism data, prosody data, or the like.

In an alternate preferred embodiment, after recordings or live-monitored segments of phone calls are reduced to recording-point invariant time-correlated data sets, a sequence hashing algorithm is applied to these data sets and/or time-windowed subsets of these data sets to produce further data-reduced numbers where a single number is produced for each entire data set or time-windowed subset of each data set run through such hashing algorithm. In a preferred embodiment, the hashing algorithm used will produce an approximately identical numerical result for any sequence of time/value pairs that are a close match (for instance, where detected-condition time boundaries are close to the same, or where data values associated with each time interval (for instance, vowel data or voice print code book identification) are within a predetermined tolerance of being identical, or both). One example of such a time-sequence hashing algorithm is discussed in "An Efficient Hash-Based Algorithm for Sequence Data Searching", by K. W. Chu, S. K. Lam and M. H. Wong (The Computer Journal 1998 41(6):402-415). Another such hashing algorithm is discussed in "Indexing Time Series Using Signatures", by H. Andre-Josson and D. Z. Badal (Intelligent Data Analysis Journal, Volume 4, Number 1/2000, pages 67-92). Both of these examples are herein incorporated by reference.

In a preferred embodiment, for each phone call recorded or analyzed live, a recording-point-invariant data set is produced for the entire call, and hashes are produced for the entire call and for subsections of the call which begin at boundaries meeting certain criteria, last for a time greater than a minimal time it would be deemed useful for someone to speak, and last until the next such definable boundary condition or for a chosen maximum amount of time.

Figure 1:
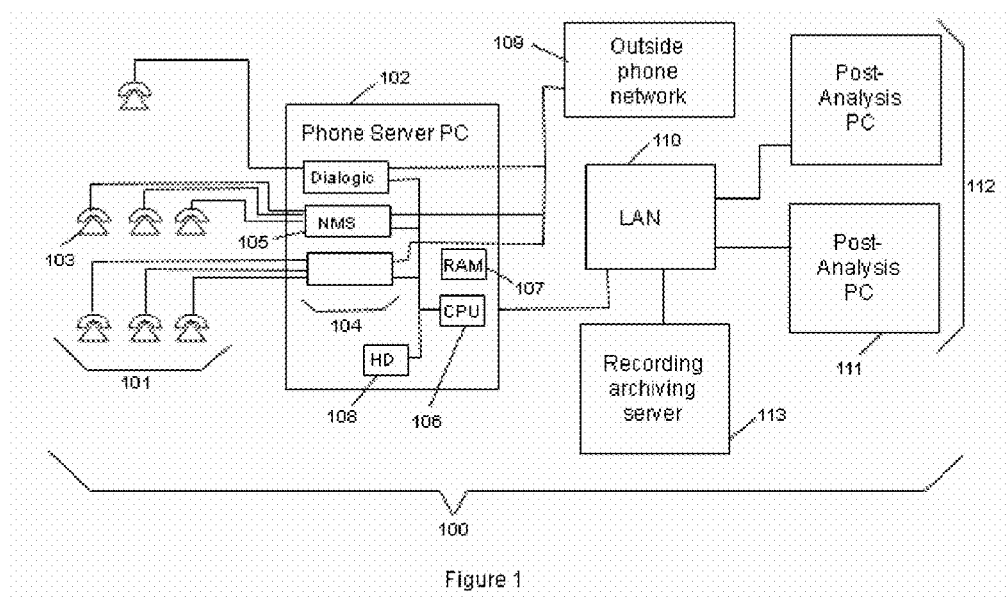
FIG. 1 is a block diagram of some of the hardware of a preferred embodiment of the present invention, which might be used within a given institution.

FIG. 1 is a more detailed block diagram of some of the hardware of a preferred embodiment of the present invention, which might be used within a given institution. In this embodiment, phone server 102 is implemented as a server PC with one or more phone cards 104 such as may be purchased from Natural Microsystems, Dialogic, Brooktrout Technologies, or Pika Technologies. In a preferred embodiment, much of the low-level computation done to extract voice parameters, etc. is done on DSP (digital signal processing) chips on board phone cards 104. Further processing and the creation of call summaries and call database entries is done by CPU 106. Both phone cards 104 and CPU 106 have direct access to RAM (random access memory) 107 and hard disk 108.

In a simplified embodiment of the present invention for use in detecting conference calls where at least two participants have dialed directly into a conference bridge (including in a simplified case each first dialing a number which can bridge their calls as a 3-way call), the data-reduced data set from each call may consist just of call start time and call duration. In a preferred embodiment of the present invention where call forwarding can be detected through a network protocol such as SS7, the data-reduced data set may consist of end number reached (detected through SS7 or the like), call start time, and call duration.

In an alternate preferred embodiment for detecting disallowed communication between inmates in institutions, institutions using the present invention may each steganographically (or in an audibly obvious way) periodically embed within the audio of each call a telephone-identifying code (and/or institution-identifying code), and each institution may process call recordings or monitor calls live to detect the codes of other institutions or other phones within the same institution. In such an embodiment, a recording-point-invariant reduced data set may consist of the code numbers of different institutions and/or telephones detected, along with the absolute time at which those codes were detected, or differential times between detections of such codes.

Ever since the telephone monopoly of the Bell System was broken up, and many competing phone service providers subsequently entered the market, telephonic communication has become less and less standardized in many respects. Since it is desirable for the methods and apparatus of the present invention to be able to reliably generate recording-point-invariant call signatures, in one aspect the present invention seeks to "equalize" some aspects of various phone systems by pre-processing audio that is monitored or recorded, to ensure that each call signature is generated from data within a similar or identical frequency bandwidth herein sometimes referred to as "like-bandwidth data").

One way to specify frequency band-pass characteristics is by specifying a range of acceptable attenuation (or loss) within specified frequency bands. Telephone companies have agreed on the following frequency/attenuation standards:

Frequency Range Loss (db)
500-2500 −2 to +8
300-3000 −3 to +12

Figure 6:
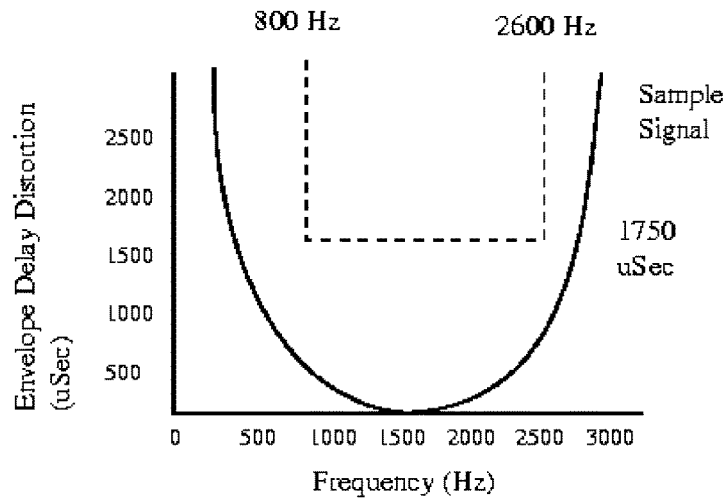
FIG. 6 depicts the envelope delay distortion specification within which various public switched telephone networks operate.

When specifying things in the frequency domain, it is relevant to put limits on both amplitude (as above) and phase (or time delay) within frequency bands of interest. Telephone companies have agreed to abide by the maximum delay vs. frequency curve shown in FIG. 6. This specification is also referred to as an "envelope delay distortion function".

Taking into account these specifications, a preferred embodiment of the present invention puts recorded or monitored conversations through a 300 Hz-to-3 kHz band-pass filter as the first step in generating a call signature.

As we have noted, one feature of like-bandwidth call recordings that is highly recording-point-invariant is the frequencies and relative heights of the formants of speech as vowels are enunciated within the conversation, particularly in situations where only one party at a time is speaking (which is usually the case, or no useful communication would be able to take place anyway).

So we know we want to derive a recording-point-invariant time-correlated reduced data set for each phone call monitored or recorded, and we have observed that even in cases of amplitude cross-attenuation, the frequency of various spectral peaks within the monitored or recorded signal will be the same at both ends of the phone call, and the ratio between the amplitudes of any two in-band frequency components will be approximately the same at each end of the phone call, provided that the significant majority of signal energy at each end of the phone call at any given moment comes only from one end of the phone call. Since intelligible communication also depends on the majority of the energy at the listener end of the phone call coming from the speaker end of the phone call, we can rely on this condition to be true for the portions of the phone call where intelligible communication is being attempted.

One preferred embodiment of the present invention creates a time-correlated recording-point-invariant reduced data set by detecting the peak enunciation times of vowels during the conversation. The portions of speech during which vowels are being enunciated will be referred to in this document as "voiced", and the portions of speech during which consonants are being enunciated or nothing is being enunciated will be referred to in this document as "unvoiced".

Figure 9:
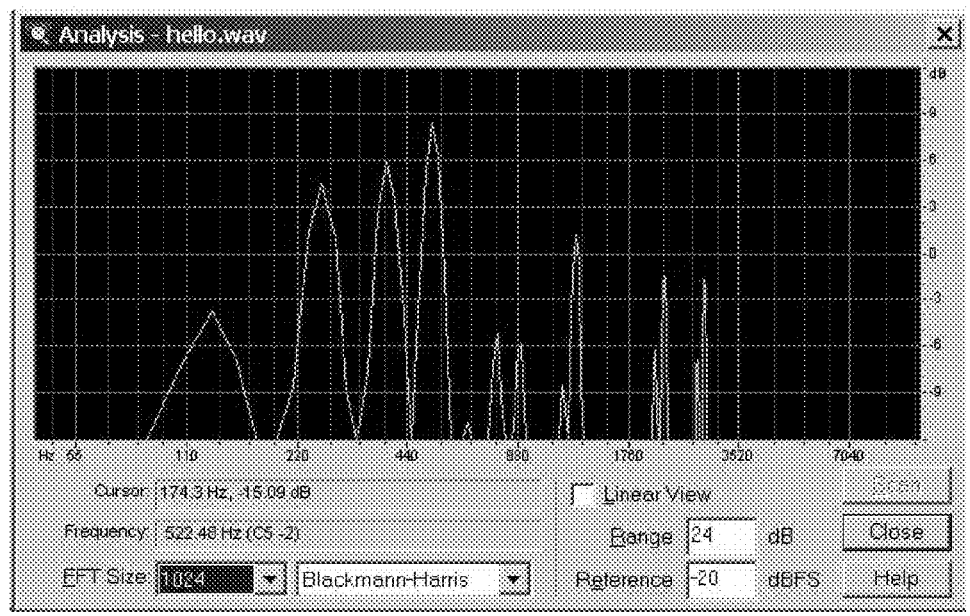
FIG. 9 depicts the frequency spectrum of the "short e" vowel sound in the word "hello", recorded without bandwidth-limiting.

During speaking, vowel sounds are created by the vocal folds (also called vocal chords) vibrating, and the shape of the vocal tract is changed over time to form the vowel sounds as a person speaks. The sound produced while enunciating vowels during speech therefore consists mainly of a collection of harmonically related frequency components. The lowest-frequency component lies at the fundamental vibration rate of the vocal folds, and the other frequency components lie on harmonics of that fundamental vibration frequency. For instance, the (non-bandwidth-limited) frequency spectrum of the "short e" vowel sound in the word "hello" is shown in FIG. 9. This spectrum was derived by taking a Blackman-Harris-windowed Fast Fourier Transform of 1024 points of data (sampled at 22,000 samples per second) around the center of the "short e" sound, which occurs 0.059 seconds into the time-domain waveform of the word "hello", shown in FIG. 10. Because vowel sounds consist spectrally of harmonic tones, they naturally produce spectral peaks with good signal-to-noise ratio in the frequency domain (or analogously they produce good autocorrelation peaks in the time domain).

The fact that vowels produce peaks with good signal-to-noise ratio in the frequency domain is precisely the reason that vowels form the main basis on which human beings recognize speech, because the vibrating of tiny frequency-sensitive hairs in the inner ear actually feed to the brain moment-by-moment a signal vector equivalent to a short-time-window Fourier transform of the sound being heard. It thus makes sense to use these same critical features of speech (vowels) to derive a time-correlated recording-point-invariant reduced data set within the present invention.

Figure 11:
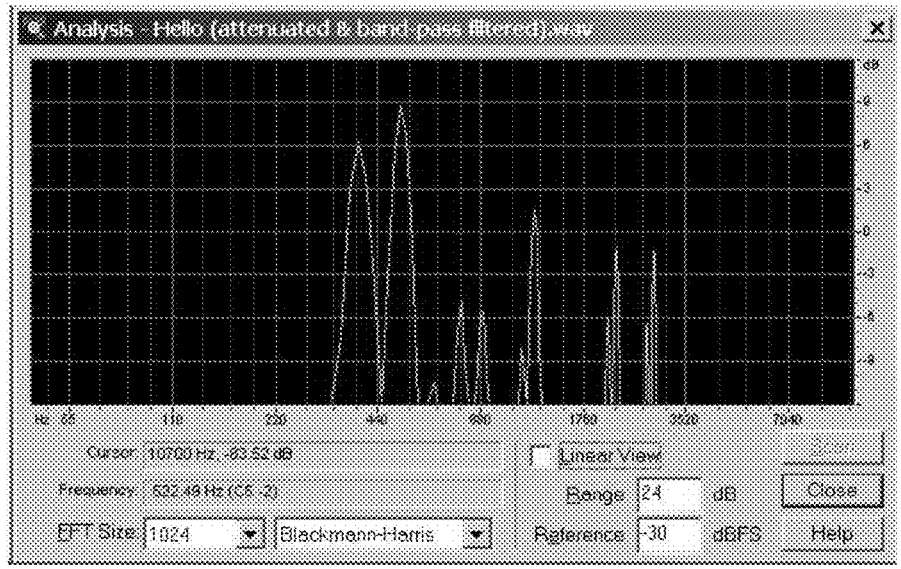
FIG. 11 depicts the frequency spectrum of the same sound whose frequency spectrum is shown in FIG. 9, recorded or monitored at the other end of the phone conversation (and thus bandwidth-limited by the phone system).

While FIG. 9 depicts the full audio spectrum of the "short e" vowel sound from a given speaker, most telephone systems will allow only a portion of that spectral energy (typically the portion between 300 Hz and 3000 Hz) to pass through the telephone system, so while the spectrum of the "short e" sound shown that could get recorded or monitored at the telephone of the speaker is as shown in FIG. 9, the spectrum of the same sound that would get recorded or monitored at the other end of the phone conversation is shown in FIG. 11. Note that while the first two speech formant peaks are present in FIG. 9 and not in FIG. 11, and while the heights of the peaks in FIG. 11 are significantly attenuated compared to those in FIG. 9 due to the bandwidth-limiting of the phone system (see difference in dB scales on the right of the figures), the ratios of the heights of the peaks that are present in both FIG. 9 and FIG. 11 remain constant. To derive a recording-point-invariant data set, we will concern ourselves only with the portion of the frequency spectrum between 300 Hz and 3000 Hz.

The fundamental vibration rate of a given person's voice will be referred to in this document as the "first formant" of that person's voice, and the second, third, and fourth harmonic, etc. will be referred to as the second, third, and fourth formant, etc. The range of first-formant frequencies found in the population ranges from about 70 Hz (for a man with a deep bass voice) to about 400 Hz (for a child's voice). The highest frequency first formant that might not make it through the phone system is therefore just below 300 Hz. If we can't detect that one (because it was cut off by the filters in the phone system), we need to be able to detect the second formant, which will be just below 600 Hz. A preferred embodiment of the present invention therefore has a processing bandwidth from 300 Hz to at least 600 Hz. There may be some individuals who talk in a way that suppresses the second formant, and there are some embodiments of the present invention which rely in part (in producing a recording-point-invariant reduced data set) on measuring ratios between the amplitudes of more than one formant of speech, so a preferred embodiment of the present invention processes signals in the bandwidth from 300 Hz to at least 900 Hz.

Figure 10:
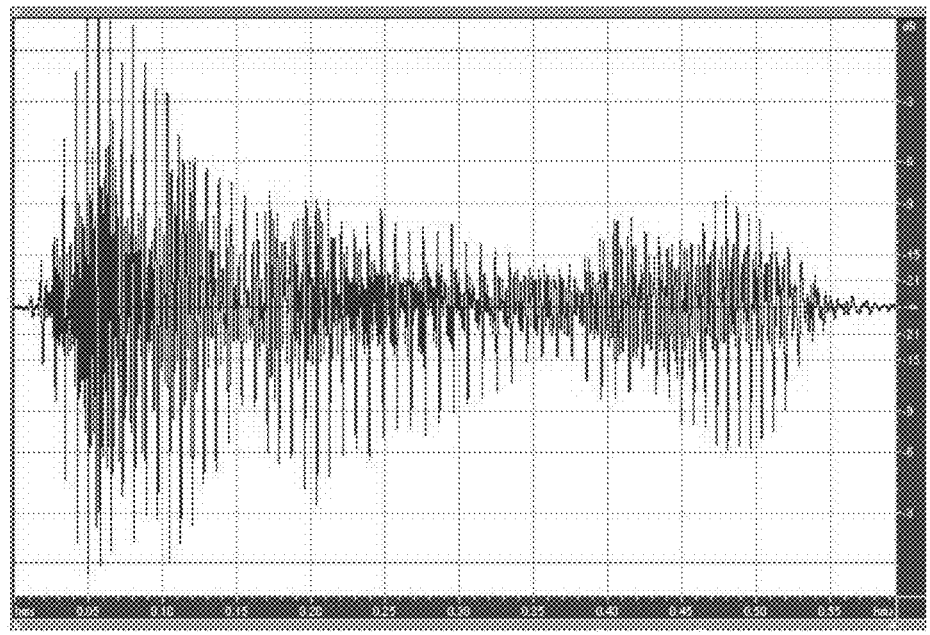
FIG. 10 depicts the time-domain waveform of the word "hello".
Figure 12:
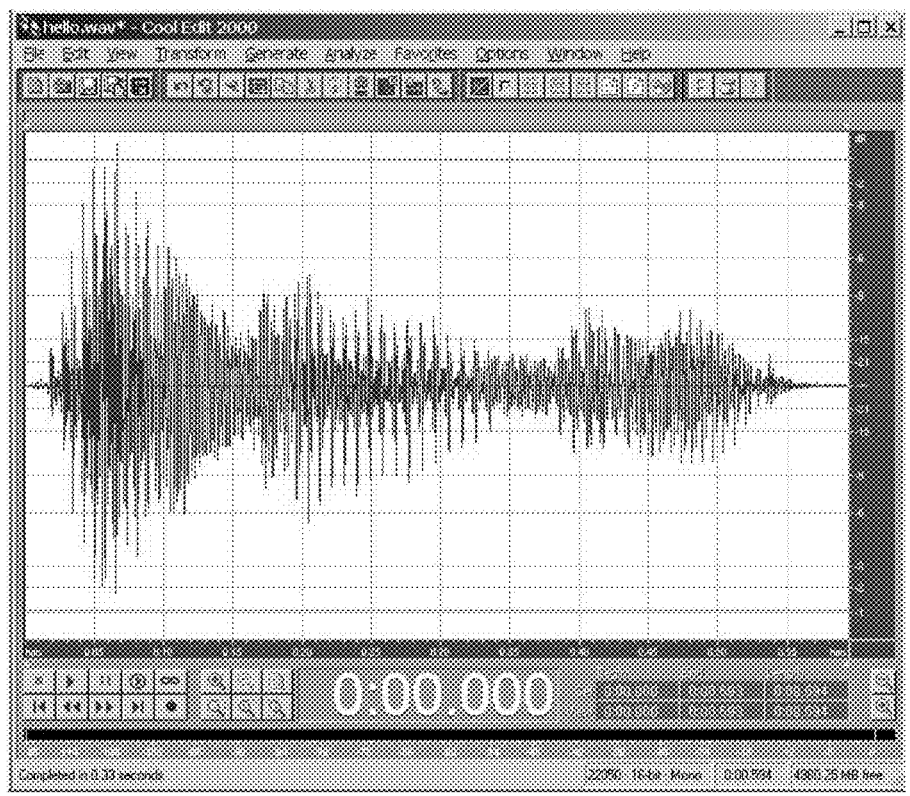
FIG. 12 depicts a (300 Hz to 3000 Hz) bandwidth-limited non-attenuated version of the time-domain "hello" shown in FIG. 10.

A (300 Hz to 3000 Hz) bandwidth-limited non-attenuated version of the time-domain "hello" shown in FIG. 10 is shown in FIG. 12. There are two vowel sounds in the word "hello", the band-limited time-domain waveform of which is depicted in FIG. 11. The first vowel sound is a "short e" sound which comes just after the (non-voiced) sound of the "h". The center of the "short e" sound occurs about 0.059 seconds along the time axis of FIGS. 10 and 12. The second vowel sound is the "long o" sound which comes toward the end of the word. Let's take a look at how the amplitudes of the various formants of speech behave during the pronunciation of the vowel sounds.

Even if we didn't have the original frequency spectrum of FIG. 9, we can see that the frequency distance between the spectral peaks shown in FIG. 11 is about 134 Hz, indicating that the first formant of the voice of the person speaking is 134 Hz. Even though the first formant is not present in the signal after it has passed through the telephone system, the human brain will hear the voice in a very similar way to how it would be heard of the first formant was present, because the spectral pattern is mostly the same.

Figure 13:
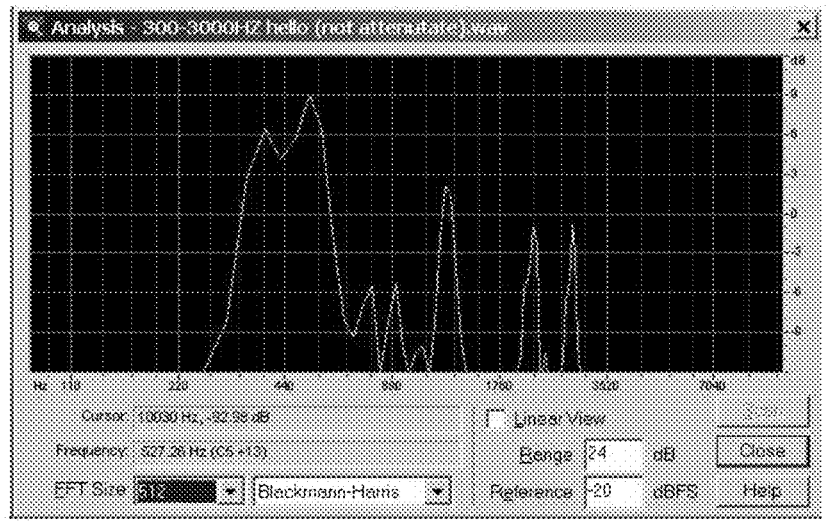
FIG. 13 depicts a 512-point FFT of the same data whose spectrum is depicted in FIG. 11.

The 1024-point FFT used to derive the "short e" spectrum shown in FIGS. 9 and 11 represents about one half of one tenth of a second (or 50 milliseconds) of the data (which was sampled at 22,000 samples per second). This time window is long enough to allow the formants to show up as distinct peaks in FIGS. 9 & 11, and short enough to be "fast" compared to human reaction time. If we had used a shorter time window, the frequency resolution of the FFT would be less precise, and the peaks representing the formants would start to lump together, making it more difficult or impossible to distinguish the formants from one another. This "lumping together" can be seen in the 512-point FFT depicted in FIG. 13 (compare to FIG. 11), and even more so in the 256-point FFT depicted in FIG. 14 (compare to FIGS. 13 and 11).

Figure 14:
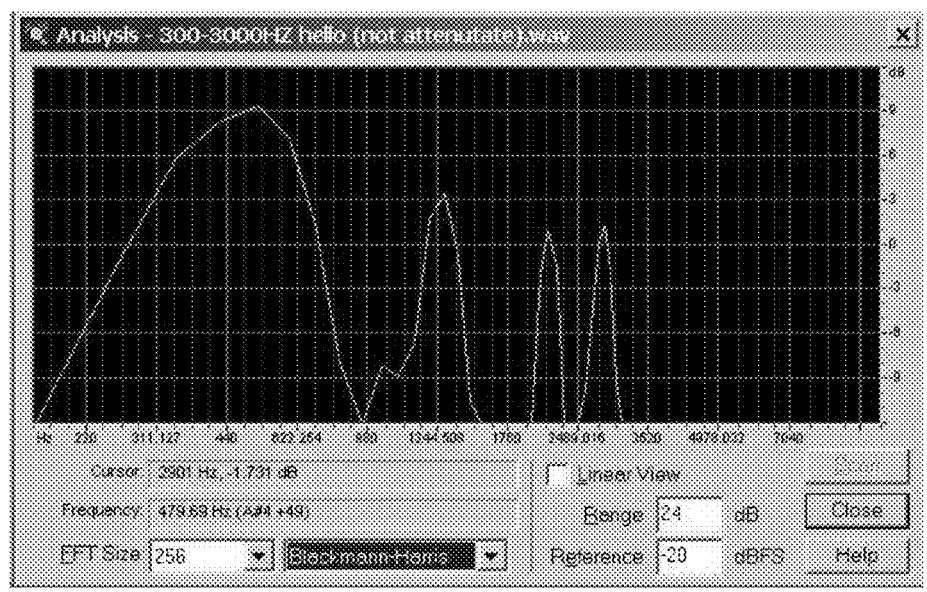
FIG. 14 depicts a 256-point FFT of the same data whose spectrum is depicted in FIG. 11.

In the (256-point-FFT-derived) spectrum depicted in FIG. 14, it can be seen that the first two peaks of FIG. 11 (representing the 3d and 4th formants of speech, at 289 Hz and 522 Hz, respectively) are subsumed within a wide "fictitious" peak at 479 Hz. Thus it can be difficult or impossible to derive the frequency of the first formant of speech if an FFT of insufficient frequency resolution is used. Analogously, in the time domain, it can be difficult or impossible to derive the frequency of the first formant of speech if an autocorrelation function of insufficient time resolution is used.

We will now take a look at the time-varying nature of the magnitudes of the various speech formants across the time span of the "short e" vowel sound centered 0.059 seconds along the time line of FIG. 12. The full spectrum (derived from a 1024-point Blackman-Harris-windowed Fast Fourier Transform) at the center of the "short e" as recorded before the signal is passed through a telephone system is shown in FIG. 9. The full spectrum (derived from a 1024-point Blackman-Harris-windowed Fast Fourier Transform) at the center of the "short e" as recorded after the signal has been passed through a telephone system (and has therefore been band-limited to the 300 Hz to 3000 Hz bandwidth) is shown in FIG. 11.

Figure 15:
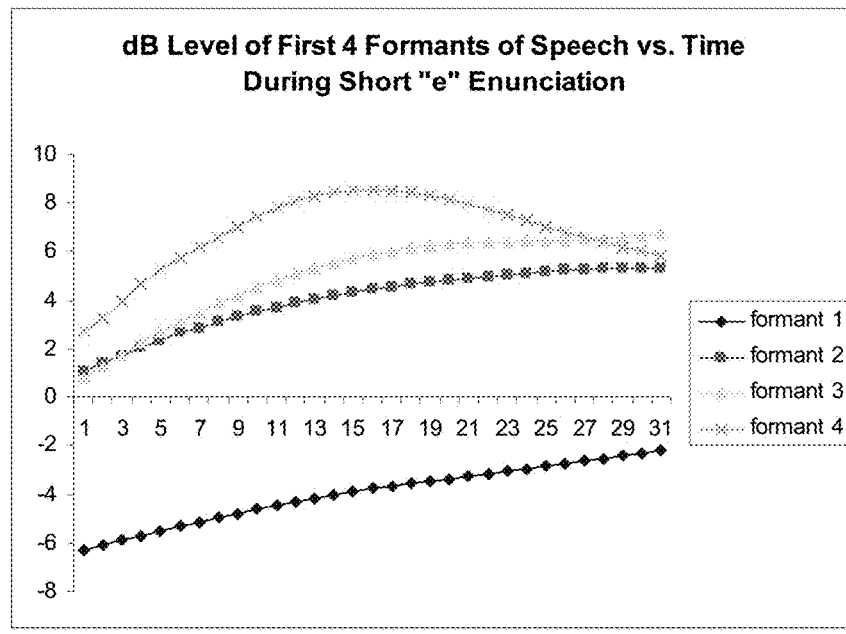
FIG. 15 depicts the dB level of the first 4 formants of speech vs. time during the short "e" enunciation. The 15 ms mark in FIG. 15 corresponds to the point 59 ms into FIG. 10.

FIG. 15 depicts the time vs. magnitude behavior of the first four formants of speech during enunciation of the "short e" in "hello", from 15 ms prior to the center of the vowel sound to 15 ms after the center of the vowel sound. Time increments along the x axis in FIG. 15 are milliseconds. Note that the first two formants of the voice in this example are not passed through the telephone system, so they are not used in a preferred embodiment of the present invention when deriving a recording-point-invariant reduced data set (also referred to in this document as a call signature).

It can be seen that the third formant (which does pass through telephone systems and therefore can be used in a preferred embodiment of the present invention) peaks at roughly the center of the "short e" sound in the word "hello", whereas the other formants peak at substantially different times. Voiced consonant sounds (such as the sound of "L" in "hello" coincide in time with peaks in the time-varying formants, just as vowel sounds do.

The peaking time of the third formant in the "short e" vowel sound whose formant temporal behavior is shown in FIG. 15 is fairly insensitive to background noise. Background white noise 33 dB down from the voice levels in the conversation only changes the position of this temporal peak on the order of one millisecond.

In a preferred embodiment of the present invention, the recording-point-invariant reduced data set (call signature) is derived from the sharper, more well-defined peaks found over time in the formants which are within the processing bandwidth used (for instance within a 300 to 600 Hz bandwidth, or within a 300 to 900 Hz bandwidth). While any temporal maximum of a speech formant may theoretically occur at a single point in time, it is desirable in a preferred embodiment of the present invention to make periodic measurements of the heights of the spectral peaks at regular time intervals (to reduce computational load), in which case such measurement interval should be chosen to be short compared with the expected temporal width of the peaks (as exemplified in FIG. 15) whose time center we wish to find, and long compared to the period of the speech formants being measured.

For the purposes of this document, we will define the width of a temporal peak as being the time between the times when the peaking formant falls 3 dB below its peak value on opposite sides of the peak along a time line. These points may also be referred to as the temporal half-power points of the peak. For example, referring to formant 4 in FIG. 15, the time between 7 ms and 29 ms represents the width of the "short e" vowel sound in the word "hello", the time-domain waveform of which is shown in FIG. 10.

In a preferred embodiment, only "well defined" temporal peaks in the time-varying spectral peak value function of each formant within the processing bandwidth are used as components of the recording-point-invariant reduced data set (call signature) derived according to the present invention. A well-defined temporal peak may be defined as a peak with less than some predetermined width in time. An alternate embodiments, more complex criteria (than simply a width defined by half-power points) may be specified to choose a peak that qualifies to be part of the call signature. In a preferred embodiment, more than one characterization of a given well-defined peak may be incorporated in the call signature. In a preferred embodiment, several dimensions of data can be used to derive a single recording-point-invariant time-correlated data bundle. Because the bundle must be time correlated, in a preferred embodiment, one component of the data bundle will be the amount of time after the previously detected temporal peak at which the next temporal peak takes place. Other components of the data bundle which may be added to increase the effective signal-to-noise ratio of the recording-point-invariant data set may include:

1) The temporal width of the peak (for instance, at its half-power points)
2) The frequency of the formant whose temporal peak was detected.
3) the ratio of amplitude (or difference in amplitude expressed in dB) of the currently detected temporal peak compared to the previously detected temporal peak.

Temporal peaks in the various formants are not the only highly temporally distinguishable features of speech that might be used as components of a recording-point invariant reduced data set. As an example of another type of feature that could be used, the occurrence in time of predetermined ratios of the magnitudes of various formants can also be used. For instance, looking at FIG. 15, we note that during a span of time the magnitude of the 4th formant is decreasing while the magnitude of the first formant is increasing, and at one point in time the magnitudes of these two formants cross. The time of such a crossing point (or, to avoid reference to absolute time, the difference in time between such a detected crossing and the previously detected similar crossing) may be used as the temporal part of a recording-point-invariant time-correlated data chunk (subset of a data-reduced data set), and an additional (signal-to-noise-increasing) component of the data chunk correlated with that time may be (for example) the (derived or measured) frequency of the first formant.

Above we have described the conditions that may be detected at certain times in live-monitored or recorded audio and used to generate time-correlated data chunks which make up a recording-point-invariant time-correlated data set (call signature) according to a preferred embodiment of the present invention. In a preferred embodiment, each call signature consists of a sequence of such data chunks, each describing an audio feature point, and its time relationship to the previous audio feature point within that call signature.

Figure 16:
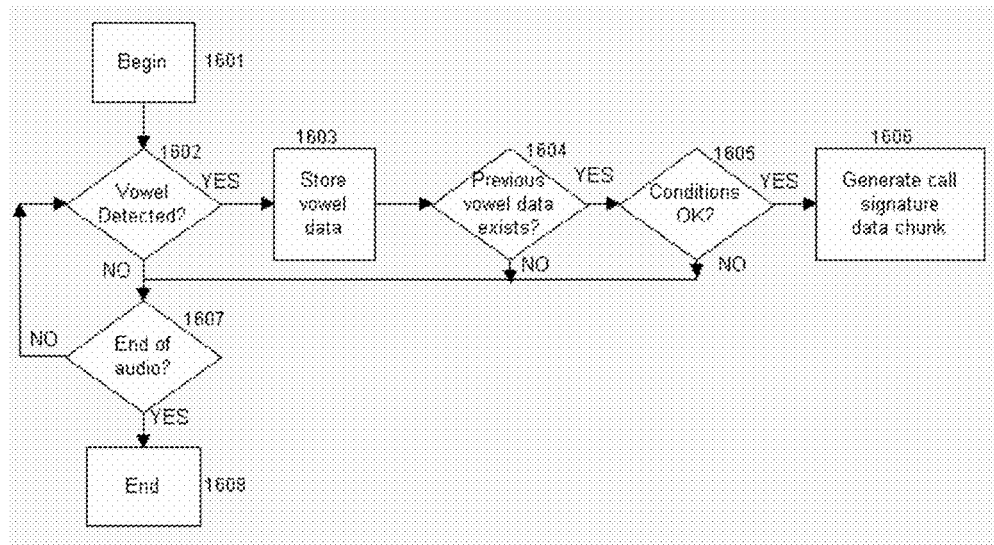
FIG. 16 is a flow diagram of a process of generating a call signature data set from a single audio signal monitor point or recording according to a preferred embodiment of the present invention.

A process for generating a segmented time-correlated, recording-point-invariant data set (call signature) according to a preferred embodiment of the present invention is illustrated in FIG. 16. At step 1601, we begin monitoring audio (for instance live audio on a phone line at a prison, or a recording of such audio). A fast Fourier Transform (FFT) is used to periodically analyze audio within a sliding time window of the audio signal stream. In a preferred embodiment, whenever a vowel is detected in the audio stream at step 1602, vowel data (such as which vowel, and the time of the well-defined formant peak in the vowel) are stored. Each time subsequent vowels are detected, data-chunk-parameters are checked is step 1605 to determine if the parameters of the call signature data chunk potentially to be generated meet certain predetermine criteria. For instance, one criteria might be that the signal-to-noise ratio is above a predetermined level. Another criteria might be that the previously-detected vowel was detected less than some predetermined time in the past.

If data-chunk parameters are acceptable, a call signature data chunk is generated in step 1606. An example call signature data chunk might consist of a code specifying the type of first and second vowel, and the time between the two, or the data chunk might consist of a hash of those three pieces of data, calculated in such a way that changing either vowel to a similar-sounding vowel, or changing slightly the differential time, would produce a hash number that was close in value. In such an embodiment, the entire call signature would consist of a sequence of such hashes.

In an alternate embodiment, hashes are each generated from the most recently detected three vowel events rather than the most recently detected two vowel events. Hashes may also be generated from differential time data between detected vowel events, without regard to what vowel was detected.

In an alternate preferred embodiment, if the differential time between two detected recording-point-invariant features (such as temporal peaks of formants during enunciation of vowels) are close to a time quantization boundary, data chunks or hashes for both quantization values may be generated.

In a preferred embodiment, call signature data chunks (such as hashes) are generated not only from small sequences of detected recording-point-invariant events, but also from larger sequences of such events, to facilitate fast first-level searches for other phone calls with identical call signature subsections.

When a probable forbidden 3-way phone call is detected by the present invention, or multiple phone calls with substantially identical conversation segments are detected, in a preferred embodiment of the present invention, such probable events are stored as part of the call record in the inmate calling system database of the facility from which the call was placed, and such calls are displayed automatically or on demand to call control officials or investigators seeking to detect such calls. Depending on the embodiment, display may be by printing, monitor, audio, or other computer display means as are known or may become known in the art.

The term "database" as used herein may refer to a commercial software database product such as Oracle™, or it may refer to a custom-designed data storage arrangement capable of storing different data constructs (such as phone numbers, times, names, digitized audio, etc.), and relationships between such constructs (such as the relationship that digital audio file A represents the audio on a phone call of time duration B placed by a person of name C having inmate identification number D at time E on date F).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable non-transitory mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software. Digital results of any automated process herein may be stored in a non-transitory storage medium such as ROM, RAM, FLASH memory, magnetic disc, etc.; may be printed on paper; may be displayed visually (for instance on a computer monitor, cell phone, or other visible display); may be displayed in audio (for instance synthesized speech); or may be displayed by printing.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a non-transitory machine readable medium such as a storage medium. One or more processors may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The invention claimed is:

1. A system for detecting disallowed voice communications between a first person and second person, the system comprising:
   one or more processors; and
   a memory device coupled to the one or more processors, the memory device storing computer-readable instructions that, upon execution by the one or more processors, cause the system to:
   record digital audio captured at a first communication device used by the first person to produce a first recording of the first person participating in a first communication;
   record digital audio captured at a second communication device used by the second person to produce a second recording of the second person participating in a second communication;
   generate a first reduced data set from the first recording, wherein the first reduced data comprises a first voiceprint;
   generate a second reduced data set form the second recording, wherein the second reduced data comprises a second voiceprint; and
   correlate the first reduced data set and the second reduced data set to in order to identify portions of the first recording and the second recording that overlap in time, wherein the overlapping portions are correlated greater than a pre-determined threshold, and wherein the correlation of the overlapping portions indicates a disallowed voice communication between the first person and the second person.

2. The system of claim 1, wherein the first reduced data set comprises a first signature vector and the second reduced data set comprises a second signature vector.

3. The system of claim 2, further comprising
detecting a first recording-point-invariant audio event in the first voice recording and a second recording-point-invariant audio event in the second voice recording.

4. The system of claim 3, wherein the first signature vector is calculated based on the first recording-point-invariant audio event and the second signature vector is calculated based on the second recording-point-invariant audio event.

5. The system of claim 4, wherein the first recording-point-invariant audio event and the second recording-point-invariant audio event have different amplitudes.

6. The system of claim 5, further comprising:
correlating the first signature vector and the second signature vector in order to determine that the first voice recording and the second voice recording comprise a voice communication between the first person and the second person.

7. The system of claim 5, wherein the first recording-point-invariant audio event and the second recording-point-invariant audio event each comprise one or more vowel sounds.

8. The system of claim 1, wherein the first communication comprises a communication between the first person and a third person and wherein the second communication comprises a communication between the second person and the third person.

9. The system of claim 8, wherein the correlation of the overlapping portions indicates the assistance of the third person in the communication between the first person and the second person.

* * * * *